(12) United States Patent
Shiina et al.

(10) Patent No.: US 7,839,749 B2
(45) Date of Patent: Nov. 23, 2010

(54) RECORDING APPARATUS AND RECORDING METHOD, REPRODUCING APPARATUS AND REPRODUCING METHOD, AND PROGRAM

(75) Inventors: Hiroki Shiina, Kanagawa (JP); Kenichiro Nagano, Chiba (JP); Tetsuhiro Maeda, Tokyo (JP); Atsushi Mae, Tokyo (JP); Yukio Isobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 789 days.

(21) Appl. No.: 10/586,120

(22) PCT Filed: Sep. 29, 2005

(86) PCT No.: PCT/JP2005/017964

§ 371 (c)(1),
(2), (4) Date: Jun. 4, 2007

(87) PCT Pub. No.: WO2006/054392

PCT Pub. Date: May 26, 2006

(65) Prior Publication Data

US 2008/0316881 A1    Dec. 25, 2008

(30) Foreign Application Priority Data

Nov. 17, 2004    (JP)    ............................. 2004-333058

(51) Int. Cl.
*G11B 7/00*    (2006.01)

(52) U.S. Cl. .................................................. 369/59.25

(58) Field of Classification Search ........................ None
See application file for complete search history.

(56) References Cited

U.S. PATENT DOCUMENTS

| 7,020,057 | B2 * | 3/2006 | Kobayashi et al. | 369/47.19 |
| 2003/0185130 | A1 * | 10/2003 | Kamperman et al. | 369/59.25 |
| 2004/0210593 | A1 | 10/2004 | Hirano et al. | |
| 2006/0187793 | A1 * | 8/2006 | Fujiki | 369/59.25 |
| 2007/0147202 | A1 * | 6/2007 | Kahlman | 369/47.19 |

FOREIGN PATENT DOCUMENTS

EP    0 992 996    4/2000

(Continued)

*Primary Examiner*—Peter Vincent Agustin
(74) *Attorney, Agent, or Firm*—Finnegan, Henderson, Farabow, Garrett & Dunner, L.L.P.

(57) ABSTRACT

The present invention relates a recording apparatus and a recording method, a reproducing apparatus and a reproducing method, and a program that make it possible to easily judge whether data was recorded in a recording medium by an apparatus of own model. An own model/another model information generating unit 41 generates, for each arbitrary recording unit, own model/another model information that is information indicating that the recording unit was recorded by an apparatus of own model. A discrimination code calculating unit 42 sets VMGI and an effective management table TV as a continuous data sequence and sets a result of calculating a hash value of the data sequence as a discrimination code. A recording and reproducing apparatus 1 records the discrimination code and the own model/another model information in a management table TV area of an optical disk 51. When a discrimination code' obtained by calculating the hash value and a discrimination code recorded in the optical disk 51 coincide with each other, the recording and reproducing apparatus 1 reads out the own model/another model information. It is possible to apply the invention to a recording and reproducing apparatus.

17 Claims, 15 Drawing Sheets

FOREIGN PATENT DOCUMENTS

| | | |
|---|---|---|
| EP | 0840927 | 5/2000 |
| JP | 11-514482 | 12/1999 |
| JP | 2000-182363 | 6/2000 |
| JP | 2003-331563 | 11/2003 |
| JP | 2004-021996 | 1/2004 |
| WO | WO 97/05616 | 2/1997 |

* cited by examiner

FIG. 5

| NUMBER OF TITLES | 2 | START POINT ADDRESSES OF RESPECTIVE VTSS |
|---|---|---|
| VTS#1 | 10 | ADDRESSES OF START POINTS AND END POINTS OF RESPECTIVE CHAPTERS |
| VTS#2 | 20 | ADDRESSES OF START POINTS AND END POINTS OF RESPECTIVE CHAPTERS |

MANAGEMENT TABLE TV

FIG. 7

AREA FOR MANAGEMENT TABLE TV

| MANAGEMENT TABLE TV | DISCRIMINATION CODE | OWN MODEL/ ANOTHER MODEL INFORMATION | FREE ZONE | VMGI |
|---|---|---|---|---|

RECORDING APPARATUS AND RECORDING METHOD, REPRODUCING APPARATUS AND REPRODUCING METHOD, AND PROGRAM

TECHNICAL FIELD

The present invention relates a recording apparatus and a recording method, a reproducing apparatus and a reproducing method, and a program, and, more particularly to a recording apparatus and a recording method, a reproducing apparatus and a reproducing method, and a program that make it possible to easily judge whether data was recorded in a recording medium by an apparatus of own model.

BACKGROUND ART

In recent years, DVD (Digital Versatile Disk) recording and reproducing apparatuses such as a DVD recorder and a DVD video camera of various models have been put on the market.

For example, a DVD recording and reproducing apparatus that can record and reproduce moving pictures and still pictures is disclosed in a Patent Document 1.

[Patent Document 1] JP-A-2003-331563

DISCLOSURE OF THE INVENTION

Problems that the Invention is to Solve

However, formats of data to be recorded are different depending on models of DVD recording and reproducing apparatuses. Thus, when data is additionally recorded in a recordable DVD, in which data was recorded by a DVD recording and reproducing apparatus of another model, using a DVD recording and reproducing apparatus of a model different from the model, for example, it is desired to cause a user to recognize that the data was recorded by the apparatus of another model. However, there is a problem in that it is difficult to judge whether the data already recorded in the DVD was recorded by an apparatus of own model or recorded by the apparatus of another model.

The invention has been devised in view of such a situation and makes it possible to easily judge whether data was recorded in a recording medium by an apparatus of own model.

Means for Solving the Problems

A recording apparatus of the invention is a recording apparatus that records first data in a recordable recording medium, the recording apparatus characterized by including: recording means that records the first data in the recording medium; generating means that generates, for each predetermined recording unit, second data indicating a model of the own apparatus; and calculating means that applies a predetermined function to third data, which is included in the first data recorded in the recording medium by the recording means and changes every time the first data is recorded in the recording medium by the recording means, to thereby calculate a discrimination code indicating that the recording apparatus recorded the first data in the recording medium, and in that the recording means further records the discrimination code calculated by the calculating means, the third data, and the second data generated by the generating means in the recording medium.

The calculating means may calculate the discrimination code by applying a function for reducing an amount of data to be smaller than the third data to the third data.

The calculating means may calculate the discrimination code by applying a hash function to the third data.

The third data may include at least data recorded only by the recording apparatus.

The third data may include data for managing a program area of the recording medium and control data for the recording medium.

The second data generated by the generating means may include, for each predetermined recording unit, data indicating that the recording was performed by an apparatus of the model of the recording apparatus and data indicating that the recording was performed by an apparatus of a model different from the recording apparatus.

The calculating means may calculate the discrimination code by applying the function to the second data and the third data, which are parts of the first data.

A recording method of the invention is a recording method for a recording apparatus that records first data in a recordable recording medium, the recording method characterized by including: a first recording step of recording the first data in the recording medium; a generating step of generating, for each predetermined recording unit, second data indicating a model of the own apparatus; a calculating step of applying a predetermined function to third data, which is included in the first data recorded in the recording medium by processing in the first recording step and changes every time the first data is recorded in the recording medium by the processing in the first recording step, to thereby calculate a discrimination code indicating that the recording apparatus recorded the first data in the recording medium; and a second recording step of further recording the discrimination code calculated by the processing in the calculating step, the third data, and the second data generated by the processing in the generating step in the recording medium.

A first program of the invention is a program for recording first data in a recordable recording medium, the first program characterized by causing a computer to execute processing including: a first recording step of recording the first data in the recording medium; a generating step of generating, for each predetermined recording unit, second data indicating a model of own apparatus; a calculating step of applying a predetermined function to third data, which is included in the first data recorded in the recording medium by processing in the first recording step and changes every time the first data is recorded in the recording medium by the processing in the first recording step, to thereby calculate a discrimination code indicating that the recording apparatus recorded the first data in the recording medium; and a second recording step of further recording the discrimination code calculated by the processing in the calculating step, the third data, and the second data generated by the processing in the generating step in the recording medium.

In the first invention, the first data is recorded in the recording medium, the second data indicating a model of the own apparatus is generated for each predetermined recording unit, the predetermined function is applied to the third data, which is included in the first data recorded in the recording medium and changes every time the first data is recorded in the recording medium, whereby the discrimination code indicating that the first data is recorded in the recording medium is calculated, and the discrimination code calculated, the third data, and the second data generated are further recorded in the recording medium.

A reproducing apparatus of the invention is a reproducing apparatus that reproduces first data recorded in a recording medium, the reproducing apparatus characterized by including: readout means that reads out, from the recording medium, second data indicating a model of a recording apparatus that performed recording of the first data in the recording medium, third data that changes every time data is recorded in the recording medium, and a first discrimination code indicating the model of the recording apparatus that recorded the first data in the recording medium, the second data, the third data, and the first discrimination code being included in the first data; calculating means that calculates a second discrimination code indicating the model of the recording apparatus, which recorded the first data in the recording medium, by applying a predetermined function to the third data read out by the readout means; and executing means that executes predetermined processing using the second data when the second discrimination code calculated by the calculating means and the first discrimination code read out by the readout means coincide with each other.

The calculating means may calculate the second discrimination code by applying a function for reducing an amount of data to be smaller than the third data to the third data.

The calculating means may calculate the second discrimination code by applying a hash function to the third data.

The third data may include at least data recorded only by the recording apparatus.

The third data may include data for managing a program area of the recording medium and control data for the recording medium.

The calculating means may calculate the second discrimination code by applying the function to the second data and the third data.

A reproducing method of the invention is a reproducing method for a reproducing apparatus that reproduces first data recorded in a recording medium, the reproducing method characterized by including: a readout step of reading out, from the recording medium, second data indicating a model of a recording apparatus that performed recording of the first data in the recording medium, third data that changes every time data is recorded in the recording medium, and a first discrimination code indicating the model of the recording apparatus that recorded the first data in the recording medium, the second data, the third data, and the first discrimination code being included in the first data; a calculating step of calculating a second discrimination code indicating the model of the recording apparatus, which recorded the first data in the recording medium, by applying a predetermined function to the third data read out by processing in the readout step; and an executing step of executing predetermined processing using the second data when the second discrimination code calculated by processing in the calculating step and the first discrimination code read out by processing in the readout step coincide with each other.

A second program of the invention is a program for reproducing first data recorded in a recording medium, the program characterized by causing a computer to execute processing including: a readout step of reading out, from the recording medium, second data indicating a model of a recording apparatus that performed recording of the first data in the recording medium, third data that changes every time data is recorded in the recording medium, and a first discrimination code indicating the model of the recording apparatus that recorded the first data in the recording medium, the second data, the third data, and the first discrimination code being included in the first data; a calculating step of calculating a second discrimination code indicating the model of the recording apparatus, which recorded the first data in the recording medium, by applying a predetermined function to the third data read out by processing in the readout step; and an executing step of executing predetermined processing using the second data when the second discrimination code calculated by processing in the calculating step and the first discrimination code read out by processing in the readout step coincide with each other.

In the third invention, the second data indicating a model of a recording apparatus that performed recording of the first data in the recording medium, the third data that changes every time data is recorded in the recording medium, and the first discrimination code indicating the model of the recording apparatus that recorded the first data in the recording medium, which are included in the first data, are read out from the recording medium, the second discrimination code indicating the model of the recording apparatus that recorded the first data in the recording medium is calculated by applying the predetermined function to the third data read out, and the predetermined processing is executed using the second data when the second discrimination code calculated and the first discrimination code read out coincide with each other.

Advantages of the Invention

According to the invention, it is possible to quickly play a recording medium. In particular, according to the invention, it is possible to quickly and easily determine whether data was recorded in the recording medium by an apparatus of own model.

BRIEF DESCRIPTION OF THE DRAWINGS

FIG. 5 is a diagram for explaining an example of a simple constitution of a management table TV.

FIG. 7 is a diagram for explaining data recorded in the management table TV area.

DESCRIPTION OF REFERENCE NUMERALS AND SIGNS

1: Recording and reproducing apparatus, 11: Image data inputting unit, 12: Sound data inputting unit, 13: Compression and expansion processing unit, 14: Microcontroller, 15: Encoder, 16: RAM, 17: Header information processing unit, 18: Signal processing unit, 19: RAM, 31: Image processing unit, 32: Sound processing unit, 33: Multiplexing processing unit, 41: Own model/another model information generating unit, 42: Discrimination code calculating unit, 43: RAM, 51: Optical disk

BEST MODE FOR CARRYING OUT THE INVENTION

Embodiments of the invention will be hereinafter explained with reference to the drawings.

Figure 1:
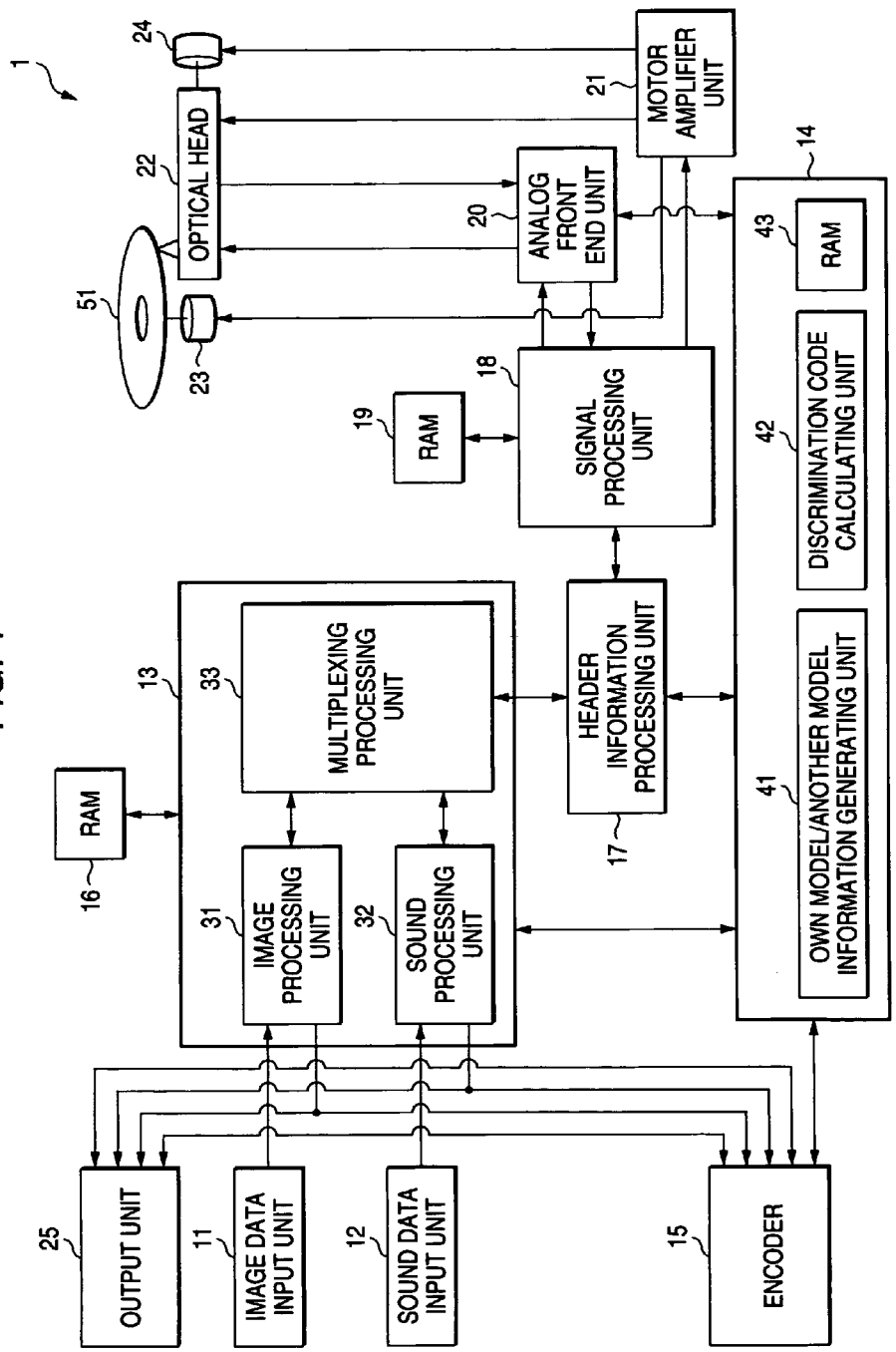
FIG. 1 is a diagram showing an example of a constitution of a recording and reproducing apparatus to which the invention is applied.

FIG. 1 is a block diagram showing an example of a constitution of a recording and reproducing apparatus 1 to which the invention is applied.

This recording and reproducing apparatus 1 is, for example, a portable video recorder and is adapted to be capable of recording an imaging result (image data) in an optical disk 51 serving as a DVD (Digital Versatile Disk). The optical disk 51 is a recordable DVD.

In FIG. 1, the recording and reproducing apparatus 1 includes an image data inputting unit 11, a sound data inputting unit 12, a compression and expansion processing unit 13, a Microcontroller 14, an encoder 15, a RAM (Random Access Memory) 16, a header information processing unit 17, a signal processing unit 18, a RAM 19, an analog front end unit 20, a motor amplifier unit 21, an optical head 22, a spindle motor 23, a thread motor 24, and an output unit 25.

In this recording and reproducing apparatus 1, the image data inputting unit 11 receives an input of an image signal that is an imaging result obtained by a not-shown imaging unit (e.g., CCD (Charge Coupled Device)) or an image signal inputted from an external apparatus, subjects the image data received to analog-to-digital conversion processing, and outputs image data. For example, the image data inputting unit 11 outputs the image data to an encoder 15, an output unit 25, or an image processing unit 31 of the compression and expansion processing unit 13. The not-shown imaging unit built in the recording and reproducing apparatus 1 is adapted to output a moving picture (a moving picture consisting of plural still pictures) and a still picture according to control by the microcontroller 14. Consequently, in the image data inputting unit 11, image data formed by the moving picture and the still picture are selectively outputted according to the control of the imaging unit by the microcontroller 14.

The sound data inputting unit 12 receives an input of a sound signal acquired by a not-shown microphone or a sound signal inputted by an external input, subjects the sound signal received to analog-to-digital conversion processing, and outputs sound data. For example, the sound data inputting unit outputs the sound data to the encoder 15, the output unit 25, or a sound processing unit 32 of the compression and expansion processing unit 13.

The compression and expansion processing unit 13 switches an operation on the basis of the control by the microcontroller 14 to process data to be recorded and process data to be reproduced. The compression and expansion processing unit 13 causes a RAM 16 to appropriately store data necessary for processing. Specifically, when the image data supplied from the image data inputting unit 11 and the sound data supplied from the sound data inputting unit 12 are recorded in the optical disk 51, the compression and expansion processing unit 13 compresses the image data and the sound data using the RAM 16 and multiplexes the image data and the sound data. Thereafter, the compression and expansion processing unit 13 outputs the data multiplexed to the header information processing unit 17. On the other hand, when the data recorded in the optical disk 51 is reproduced, the compression and expansion processing unit 13 separates the data supplied from the header information processing unit 17 into image data and the sound data using the RAM 16 in the same manner and, then, expands the image data and the sound data and outputs the image data and the sound data expanded. The RAM 16 appropriately stores the data on the basis of the control by the compression and expansion processing unit 13.

The compression and expansion processing unit 13 includes the image processing unit 31, the sound processing unit 32, and a multiplexing processing unit 33.

The image processing unit 31 of the compression and expansion processing unit 13 compresses, at the time of recording, the image data supplied from image data inputting unit 11 on the basis of the control by the microcontroller 14 and outputs the image data. In this case, when the image data is image data forming a moving picture, the image processing unit 31 compresses the image data on the basis of the standard of MPEG (Moving Picture Expert Group) 2. On the other hand, when the image data is image data forming a still picture, the image processing unit 31 compresses the image data on the basis of the standard of JPEG (Joint Photographic Expert Group). The image processing unit 31 expands, at the time of reproduction, image data supplied from the multiplexing processing unit 33 according to a data compression format (e.g., MPEG2 or JPEG) for the image data and outputs the image data.

The sound processing unit 32 of the compression and expansion processing unit 13 compresses, at the time of recording, sound data supplied from the sound data inputting unit 12 on the basis of a format such as MPEG, Dolby audio, or linear PCM and outputs the sound data. Conversely, the sound processing unit 32 expands, at the time of reproduction, sound data supplied from the multiplexing processing unit 33 according to a data compression format for the sound data and outputs the sound data.

The multiplexing processing unit 33 of the compression and expansion processing unit 13 subjects, at the time of recording, image data supplied from the image processing unit 31 and sound data supplied from the sound processing unit 32 to time division multiplexing and supplies the image data and the sound data to the header information processing unit 17. Data obtained by subjecting the image data and the sound data to time division multiplexing is referred to as time-division-multiplexed data. Conversely, the multiplexing processing unit 33 separates, at the time of reproduction, image data and sound data from time-division-multiplexed data supplied from the header information processing unit 17 and supplies the image data and the sound data to the image processing unit 31 and the sound processing unit 32, respectively.

The encoder 15 compresses image data supplied from the image data inputting unit 11 and sound data supplied from the sound data inputting unit 12 or image data and sound data outputted from the compression and expansion processing unit 13 according to a predetermined format and outputs the image data and the sound data to an external apparatus. Consequently, in this recording and reproducing apparatus 1, it is possible to output (monitor) an imaging result and a reproduction result to the external apparatus (not shown).

The output unit 25 includes a display unit and a speaker for outputting image data supplied from the image data inputting unit 11 and sound data supplied from the sound data inputting unit 12 or image data and sound data supplied from the compression and expansion processing unit 13. Consequently, in this recording and reproducing apparatus 1, it is possible to output an imaging result (i.e., display an image and output sound). In other words, according to this recording and reproducing apparatus 1, it is possible to monitor a reproduction result.

The header information processing unit 17 receives, at the time of recording, time-division-multiplexed data supplied from the compression and expansion processing unit 13, adds header information peculiar to the optical disk 51 (DVD), header information of an extended file, and the like to the data on the basis of the control by the microcontroller 14, and outputs the data. The header information processing unit 17 generates data such as a UDF (Universal Disk Format), a VMG (Video Manager), and VTSI (Video Title Set Information) according to information from the microcontroller 14 and outputs the data to the signal processing unit 18. The header information processing unit 17 separates, at the time of reproduction and the like, the header information added at the time of recording from data supplied from the signal processing unit 18 and outputs the header information to the compression and expansion processing unit 13. The header information processing unit 17 notifies the microcontroller 14 of the header information separated. The extended file is a file not defined by a DVD video format that is a format standardized for this optical disk 51. For example, the extended file is a file of a still picture (a file compressed on the basis of the standard of JPEG).

The signal processing unit 18 generates, at the time of recording, an error correction code on the basis of the data outputted (supplied) from the header information processing unit 17 using the RAM 19 and adds this error correction code to the data outputted from the header information processing unit 17. The signal processing unit 18 executes processing such as scramble processing and 8/16 modulation and outputs a data sequence based on a result of the processing to the analog front end unit 20 according to a serial data sequence. On the other hand, conversely to the recording time, the signal processing unit 18 subjects, at the time of reproduction, data outputted from the analog front end unit 20 to decoding processing, descramble processing, and error correction processing and outputs a result of the processing to the header information processing unit 17. The signal processing unit 18 subjects respective kinds of driving information for spindle control, tracking control, focus control, and thread control supplied from the microcontroller 14 to digital-to-analog conversion processing to generate driving signals for these kinds of control and outputs the driving signals to the motor amplifier unit 21.

The analog front end unit 20 generates a light quantity control signal for a laser beam irradiated from the optical head 22 on the optical disk 51 and outputs the light quantity control signal. The analog front end unit 20 holds, at the time of reproduction, a light quantity of a laser beam irradiated from the optical head 22 on the optical disk 51 at a fixed light quantity for reproduction by this light quantity control signal. On the other hand, the analog front end unit 20 changes, at the time of recording, a signal level of this light quantity control signal according to output data from the signal processing unit 18. Consequently, the analog front end unit 20 intermittently raises a light quantity of the laser beam from the light quantity at the time of reproduction to the light quantity at the time of recording according to the output data from the signal processing unit 18.

The analog front end unit 20 amplifies a result of light reception of return light supplied from the optical head 22 and executes arithmetic processing to thereby generate a reproduction signal, a signal level of which changes according to a pit row formed on the optical disk 51. The analog front end unit 20 executes signal processing on this reproduction signal to output reproduction data, which is a binary identification result of this reproduction signal, to the signal processing unit 18. According to this arithmetic processing, the analog front end unit 20 generates a tracking error signal, a focus error signal, and the like, signal levels of which change according to a tracking error amount and a focus error amount, and outputs these signals to the microcontroller 14 according to a digital signal.

The motor amplifier unit 21 drives, according to the various driving signals outputted from the signal processing unit 18, mechanisms corresponding to the driving signals, respectively. The motor amplifier unit 21 drives to rotate the spindle motor 23 and the thread motor 24 according to the driving signal for spindle control and the driving signal for thread control among these driving signals. The motor amplifier unit 21 drives an actuator mounted on the optical head 22 according to the driving signal for tracking control and the driving signal for focus control.

The spindle motor 23 chucks the optical disk 51 and drives to rotate the optical disk 51 at a predetermined rotation speed. The thread motor 24 moves the optical head 22 in a radial direction of the optical disk 51.

The optical head 22 emits a laser beam from a semiconductor laser built therein on the basis of the light quantity control signal outputted from the analog front end unit 20 and condenses this laser beam on an information recording surface of the optical disk 51 via an object lens (not shown). The optical head 22 leads a return light obtained from the optical disk 51 according to the irradiation of this laser beam to a predetermined light-receiving element via this object lens and outputs a result of light reception of the light-receiving element to the analog front end unit 20. This object lens is adapted to be movable by an actuator driven by the driving signal for tracking control and the driving signal for focus control. Consequently, the optical head 22 can perform tracking control and focus control. Since the light quantity of the laser beam is intermittently raised according to the light quantity control signal, temperature on the information recording surface of the optical disk 51 is locally raised to record desired data.

The microcontroller 14 is a computer that controls operations of the entire recording and reproducing apparatus 1. The microcontroller 14 executes various kinds of processing. The microcontroller 14 executes the various kinds of processing by executing processing programs installed in this recording and reproducing apparatus 1 in advance. For example, the microcontroller 14 executes the various kinds of processing on the basis of operation from a user obtained via a not-shown operation unit, various signals detected by the analog front end unit 20, and the like. In other words, the microcontroller 14 generates driving information for tracking control and focus control according to the tracking error signal and the focus error signal detected by the analog front end unit 20 and causes the signal processing unit 18 to convert the driving information into analog signal and output the analog signal to the motor amplifier unit 21. Consequently, the microcontroller 14 executes processing for tracking control and focus control. The microcontroller 14 detects a laser beam irradiation position according to the header information and the like detected by the header information processing unit 17, generates driving information for thread control from a result of this detection, and causes the signal processing unit 18 to output the driving information. Consequently, the microcontroller 14 executes processing such as seek. The microcontroller 14 executes processing for spindle control in the same manner.

The microcontroller 14 includes own model/another model information generating unit 41, a discrimination code calculating unit 42, and a RAM 43. It is possible to exchange data inside the microcontroller 14. The own model/another model information generating unit 41 generates, for each arbitrary recording unit, own model/another model information that is information indicating whether the recording unit was recorded by a recording and reproducing apparatus of own model (a recording and reproducing apparatus, a manufacturer and a model of which are the same as those of the recording and reproducing apparatus 1) or recorded by a recording and reproducing apparatus of another model (a recording and reproducing apparatus, a manufacturer of which is the same as that of the recording and reproducing apparatus 1 and a model of which is different from that of the recording and reproducing apparatus 1 or a recording and reproducing apparatus, a manufacturer of which is different from that of the recording and reproducing apparatus 1). In other words, the own model/another model information is information indicating own model. Details of this own model/another model information will be described later using FIG. 12. An apparatus of a predetermined model indicates an apparatus of a specific specification and indicates that apparatuses of the same model execute the same recording processing and reproduction processing. The discrimination code calculating unit 42 calculates a discrimination code that is information for determining whether a recording and reproducing apparatus that recorded data in the optical disk 51 last is an apparatus of own model or an apparatus of another model. In other words, the discrimination code is a code indicating that the recording and reproducing apparatus 1 recorded data in the optical disk 51. Details of the discrimination code will be described later using FIG. 10. Data appropriately required by the microcontroller 14 in executing the various kinds of processing are stored in the RAM 43.

Figure 2:
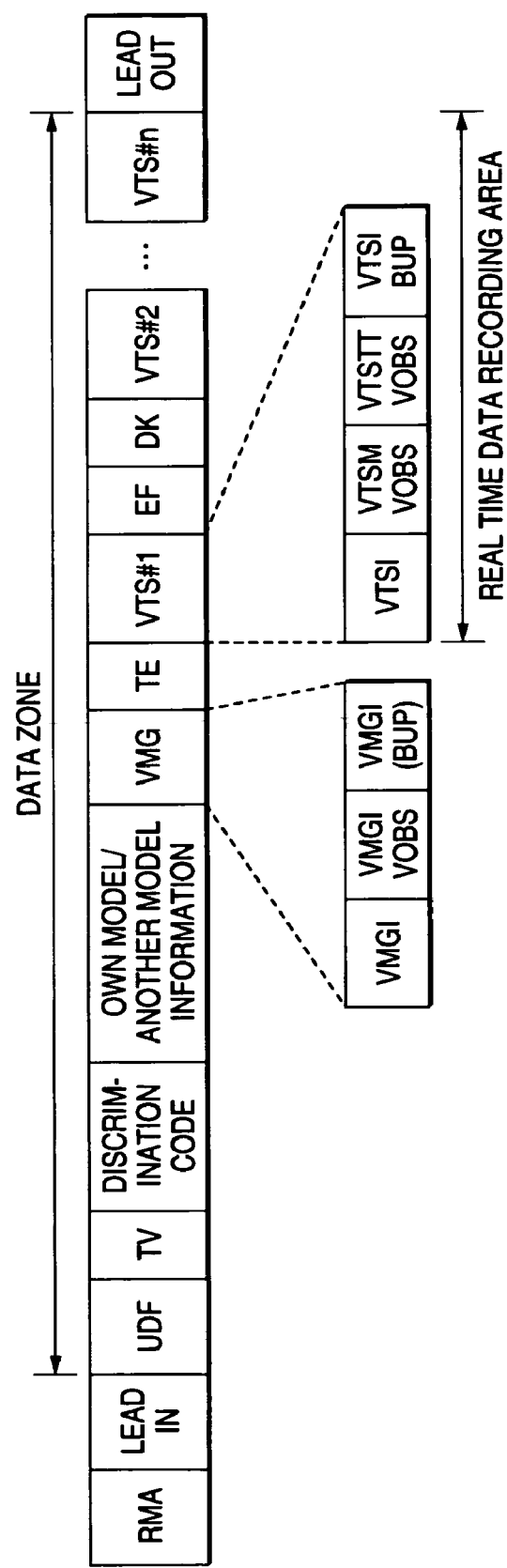
FIG. 2 is a diagram for explaining an example of a logical format of an optical disk.

FIG. 2 is a diagram for explaining an example of a logical format of the optical disk 51 based on a DVD video format. According to this format, the information recording surface of the optical disk 51 is sectioned into a Lead in, a Data Zone, and a Lead out from an innermost side that is a top side. Desired image data, sound data, and the like are recorded in the Data Zone.

The Data Zone is sectioned into a UDF (Universal Disk Format) area (a file system area), a Management table TV area (written as TV in the figure), a discrimination code area, own model/another model information area, a VMG (Video Manager) area (an information area for DVD management), a guide information TE area for an extended file (written as TE in the figure), and a real time data recording area from a lead-in side. The UDF area, the management table TV area, the VMG area, and the guide information TE area for an extended file are management information recording area for managing a file according to data recorded in the optical disk 51. Specifically, the guide information TE is information for managing an entire area in which the extended file is recorded. As described above, with the guide information TE, a recording position is defined in a management table for RMA. More specifically, with the guide information TE, it is possible to judge whether (not-shown) data included in the management table TV is recorded. A starting address and a size are defined.

The VMG area is an area for recording information for managing a DVD. Information of TOC, which is management information for managing entire image data recorded in the real time data recording area, is recorded in the VMG area. On the other hand, the UDF area is an area corresponding to a file management system by a computer. Management information for managing entire data recorded in the real time data recording area according to a format for realizing compatibility with a file system in the computer is recorded in the UDF area.

A management table TV indicating a table for managing a program area of an optical disk is recorded in the management table TV area. Specifically, it is possible to record a starting address and an end address of a VTS recorded in the real time data recording area, a starting address of the guide information TE area of the extended file, and the like in the management table TV area. An area not to be accessed in a DVD playback apparatus dedicated for playback (a DVD player) is allocated to the management table TV area. Contents of the management table TV appropriately change when addition, deletion, edition, and the like are applied to the data in the optical disk.

In this management table TV area, an area (a free zone) in which data can be freely recorded is provided other than the management table TV. In the invention, a discrimination code for determining a model of the recording and reproducing apparatus 1 and own model/another model information are recorded in the free zone provided in this management table TV area. The discrimination code is a code (data) indicating whether a recording and reproducing apparatus that recorded data in the optical disk 51 last is an apparatus of own model or an apparatus of another model. In this embodiment, the discrimination code is generated on the basis of data of the management table TV and VMGI (of the VMG) on the DVD video format. The own model/another model information is information indicating, for each predetermined recording unit recorded in the optical disk 51 (e.g., each title, that is, each VTS), whether the recording unit was recorded by an apparatus of own model or apparatus of another model. The own model/another model information is effective when a discrimination code recorded in the discrimination code area is effective (i.e., a recording and reproducing apparatus that recorded data in the optical disk 51 last is an apparatus of own model). The recording and reproducing apparatus 1 records data in the loaded optical disk 51 and, then, writes the discrimination code and the own model/another model information therein in order to indicate that the recording and reproducing apparatus 1 itself recorded data. Consequently, after the optical disk 51 is removed from the recording and reproducing apparatus 1, when the optical disk 51 is loaded in the recording and reproducing apparatus 1 again, it is possible to judge whether data was recorded in this optical disk 51 by an apparatus of own model by checking the discrimination code recorded in the management table TV area (the free zone of the management table TV area) of the optical disk 51.

The real time data recording area is a program area in which actual data is recorded. Other than image data, a file EF of a still picture, which is an extended file, intermediate management information DK, and the like are recorded in the real time data recording area with a VTS (Video Title Set) (hereinafter appropriately referred to as title) as a unit. According to the extended file EF and the intermediate management information DK, a position and the like of the extended file EF can be specified and reproduced.

Figure 3:
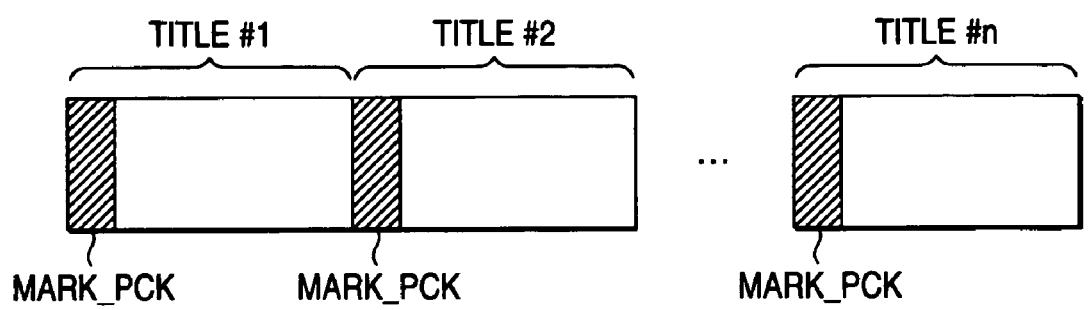
FIG. 3 is a diagram for explaining MARK_PCK.

In the VMG, VMGI (Video Manager Information), a VMGM VOBS (Video Object Set for VMG Menu), and a VMGI BUP (Backup of VMGI) are arranged from a top side. Control information for an entire video zone of a DVD is recorded in the VMGI. Information related to a menu for selecting a title is recorded in the VMGM VOBS. Information coinciding with the VMGI is recorded in the VMGI BUP as a backup. In the VTS, VTSI (Video Title Set Information), a VTSM VOBS (Video Object Set for the VTSM), A VTSTT VOBS (Video Object Set For Titles in a VTS), and a VTSI BUP (Backup of VTSI) are arranged from a top side. One VTS corresponds to one title. Image data based on a format of MPEG 2, which is actual data, is recorded in the VTSTT VOBS. Recording position information, which is management information for managing the image data formed by the actual data, and the like are recorded in the VTSI. A title menu of video data is recorded in the VTSM VOBS. The VTSM VOBS is an option. The VTSI BUP is a backup of the VTSI. MARK_PCK shown in FIG. 3 is stored in the VTSM VOBS and the VTSTT VOBS. A title in FIG. 3 corresponds to the VTSTT VOBS in FIG. 2. Model information for identifying a model of an apparatus that recorded the title (VTS) is included in the MARK_PCK. In other words, the model information of the apparatus that recorded the title is stored in each title (each VTS).

Concerning the UDF that is management information for a computer, management information is recorded to make it possible to recognize and access an extended file as well. On the other hand, concerning the VMG that is management information for DVD playback, no information related to the extended file is recorded. In this way, when the user accesses the optical disk 51 with the computer, it is possible to retrieve and reproduce a desired file with the UDF. When the user accesses the optical disk 51 with the DVD recording and reproducing apparatus, it is possible to retrieve and reproduce a desired moving picture file with the VMG. The UDF forms management information of video data recorded in the optical disk in association with a file management system of the computer. On the other hand, the VMG forms management information for moving picture data recorded in the optical disk 51 in association with the DVD recording and reproducing apparatus. The extended file is recorded to make it possible to surely perform reproduction based on the DVD video format without affecting reproduction of a motion picture at all.

As a system for writing data in the optical disk 51, in this embodiment, a ROW (Restricted Over Write) system is used. The ROW system is a system applied to an overwritable (recordable) optical disk. However, even in the ROW system, video data is sequentially recorded when data is recorded in an unrecorded area. In the ROW system, an area based on padding or the like described later is managed by an RMA (Recording Management Area) provided on an inner peripheral side of the Lead in. A procedure for recording in the optical disk 51 and areas (RMA, lead in, UDF, VMG, TE, VTS#1 to #n (EF, DK), and lead out) other than the management table TV area in FIG. 2 are basically the same as those in the system described in JP-A-2003-331563. Thus, detailed explanations of the procedure and the areas are omitted. The procedure for recording data in the optical disk 51 is not limited to the system described in JP-A-2003-331563 and may be other recording procedures.

Recording and reproduction processing in the recording and reproducing apparatus 1 in FIG. 1 will be explained with reference to a flowchart in FIG. 4. This processing is started when power-on of a power supply of the recording and reproducing apparatus 1 is instructed by the user (via a not-shown operation unit).

When the power-on of a power supply of the recording and reproducing apparatus 1 is instructed by the user, in step S11, the recording and reproducing apparatus 1 turns on the power supply. In step S12, the microcontroller 14 judges whether the optical disk 51 is loaded (in a drive) according to a result of detection by a not-shown detection mechanism of the optical disk 51. The processing is put on standby until the optical disk 51 is loaded. That is, the processing is put on standby until the optical disk 51 is inserted (loaded) in a not-shown drive of the recording and reproducing apparatus 1. In repetition of step S12, when the power supply is turned off (built down), the processing proceeds to step S13.

When it is judged in step S12 that the optical disk 51 is loaded, in step S13, the microcontroller 14 drives the thread motor 24 to move the optical head 22 to an innermost periphery of the optical disk 51 and acquires a result of reproduction on this innermost peripheral side via the signal processing unit 18 to thereby acquire management information required for recording and reproduction of the optical disk 51. Specifically, the microcontroller 14 acquires the result of reproduction on the innermost peripheral side of the optical disk 51 via the signal processing unit 18 to thereby acquire data of the VMG when the optical disk 51 has been subjected to finalize processing and acquire data of the RMA when the optical disk 51 has not been subjected to the finalize processing. According to information of the RMA, when data has already been recorded in the real time data recording area of the optical disk 51, the microcontroller 14 searches through the optical disk 51 to acquire data of the VTSI and VTSTT VOBS of each VTS. In this way, like a recording and reproducing apparatus that performs recording of data in and reproduction of data from a usual DVD, the microcontroller 14 acquires management information for the optical disk 51 required for recording and reproduction of the optical disk 51. In the processing in step S13, the microcontroller 14 acquires data of the UDF in addition to the data of the VMG. When the intermediate management information DK is recorded (FIG. 2) in reproduction of the real time data recording area, the microcontroller 14 also acquires this intermediate management information DK. Consequently, in order to make it possible to reproduce an extended file not defined by the DVD-video format from the optical disk 51, the microcontroller 14 is adapted to also acquire management information for the extended file. The microcontroller 14 records and holds a series of management information acquired in this way in the RAM 43 (FIG. 1).

To explain more in detail, the optical head 22 is moved to the inner peripheral side of the optical disk 51 according to driving of the thread motor 24 by the microcontroller 14 via the signal processing unit 18 and the motor amplifier unit 21. The optical head 22 irradiate a laser beam on the optical disk 51. A result of light reception of return light by the optical head 22 is sequentially processed by the analog front end unit 20 and the microcontroller 14. Processing of tracking control and focus control is executed according to the control of the optical head 22 by the processing of the microcontroller 14 via the signal processing unit 18 and the motor amplifier unit 21. Data recorded in the optical disk 51 is reproduced according to processing of the result of light reception by the signal processing unit 18. In the recording and reproducing apparatus 1, various kinds of information recorded on the inner peripheral side of the optical disk 51 are acquired by the microcontroller 14 and held in a memory built in the microcontroller 14 according to the series of processing. Procedures in various kinds of reproduction processing are the same in the following description. Thus, explanations of the procedures are appropriately omitted.

In step S14, the recording and reproducing apparatus 1 executes processing for determining own model/another model recording. This processing is processing for judging, on the basis of the discrimination code (FIG. 2) recorded in the discrimination code area, whether an apparatus that recorded data in the optical disk 51 last is an apparatus of own model or an apparatus of another model. Details of this processing will be described later with reference to FIG. 8. When nothing is recorded in the optical disk 51, the processing in step S14 is skipped.

In step S15, the microcontroller 14 judges whether removal of the optical disk 51 is instructed (by the user). Specifically, the microcontroller 14 judges whether discharge (ejection) of the optical disk 51 is instructed by the user. When it is judged in step S15 that removal of the optical disk 51 is instructed, the recording and reproduction processing proceeds to step S20 described later.

When it is judged in step S15 that removal of the optical disk 51 is not instructed, the recording and reproduction processing proceeds to step S16. The microcontroller 14 judges whether recording is instructed by the user. Specifically, the microcontroller 14 judges whether recording is instructed or reproduction is instructed by the user via the not-shown operation unit. When recording is instructed in step S15, the recording and reproduction processing proceeds to step S17. The recording and reproducing apparatus 1 executes recording processing. Details of this processing will be described later with reference to FIG. 11.

When it is judged in step S16 that recording is not instructed, that is, it is judged that reproduction is instructed, the recording and reproduction processing proceeds to step S18. The recording and reproducing apparatus 1 executes reproduction processing. Specifically, when the instruction for reproduction from the user is an instruction for reproduction of a moving picture, the microcontroller 14 controls an operation of the entire recording and reproducing apparatus 1 to reproduce a file of the moving picture, for which reproduction is instructed, on the basis of the management information (the management information acquired in step S13) stored in the built-in memory (the RAM 43 in FIG. 1).

Specifically, when the optical disk 51 is an optical disk subjected to the finalize processing, the microcontroller 14 detects a recording position of the corresponding file on the basis of the data of the VMG stored in the memory and instructs respective units to perform reproduction from this recording position. Consequently, in the recording and reproducing apparatus 1, when playback of the optical disk 51 is instructed by the user, the optical head 22 performs seek up to a recording position of a title desired by the user according to driving of the thread motor 24 via the signal processing unit 18 and the motor amplifier unit 21 in accordance with the data of the VMG. Moreover, in a state in which tracking control and focus control are performed according to a result of light reception by the optical head 22, the result of light reception by the optical head 22 is sequentially processed by the signal processing unit 18, the header information processing unit 17, and the compression and expansion processing unit 13 to reproduce image data formed by the moving picture. In other words, a reproduction signal, a signal level of which changes according to a pit row of the optical disk 51 that is the result of light reception, is processed by the analog front end unit 20 to generate reproduction data. This reproduction data is subjected to decoding, deinterleave, and error correction processing by the signal processing unit 18. The reproduction data subjected to the error correction processing is inputted to the header information processing unit 17. A header is removed and information on the header is notified to the microcontroller 14. Subsequently, the reproduction data is inputted to the compression and expansion processing unit 13 and separated into image data and sound data by the multiplexing processing unit 33. The image data is released from data compression (expanded) on the basis of the standard of MPEG by the image processing unit 31 and displayed on the output unit 25 or outputted to the external apparatus by the encoder 15. On the other hand, the sound data is expanded by the sound processing unit 32 and, then, outputted as sound by the output unit 25 or outputted to the external apparatus by the encoder 15.

On the other hand, when the optical disk 51 is an optical disk that has not been subjected to the finalize processing, the microcontroller 14 detects, according to the management table TV and a VTSI and a VTSTT VOBS of a title corresponding thereto held in the memory, a recording position of a file corresponding thereto and instructs the respective units of the recording and reproducing apparatus 1 to perform reproduction from this recording position. Consequently, reproduction processing is performed. This processing continues to be executed until stop of the reproduction is instructed. When stop of the reproduction is instructed by the user, the microcontroller 14 controls the recording and reproducing apparatus 1 to end the operation of reproduction and stops the reproduction.

On the other hand, when the reproduction instructed by the user is reproduction of an extended file and the optical disk 51 is an optical disk subjected to the finalize processing, the microcontroller 14 detects, according to the data of the UDF held in the memory, a recording position of a file corresponding thereto and instructs the respective units of the recording and reproducing apparatus 1 to perform reproduction from this recording position. Moreover, when the reproduction instructed by the user is reproduction for an extended file and the optical disk 51 is an optical disk that has not been subjected to the finalize processing, the microcontroller 14 detects, on the basis of the management table TV, guide information, and the intermediate management information DK corresponding thereto held in the memory, a recording position of a file (an extended file) corresponding thereto and instructs the respective units of the recording and reproducing apparatus 1 to perform reproduction from this recording position. Consequently, reproduction processing is performed. This processing continues to be executed until stop of the reproduction is instructed. When stop of the reproduction is instructed by the user, the microcontroller 14 controls the recording and reproducing apparatus 1 to ends the operation of the reproduction and stops the reproduction.

After the processing in step S17 or after the processing in step S18, the recording and reproduction processing proceeds to step S19. The microcontroller 14 judges whether power-off is instructed by the user. When it is judged that power-off is not instructed by the user, the recording and reproduction processing returns to step S15 and the processing in step S15 and the subsequent steps is repeated.

When removal of the disk is instructed in step S15, the recording and reproduction processing proceeds to step S20. The microcontroller 14 records the management table TV in the optical disk 51. Specifically, the microcontroller 14 records the management table TV held in the built-in RAM 43 in the optical disk 51.

In step S21, the recording and reproducing apparatus 1 execute discrimination code recording processing. Specifically, the recording and reproducing apparatus 1 calculates a discrimination code indicating that the recording and reproducing apparatus 1 recorded data in the optical disk 51 and records the discrimination code as shown in FIG. 2. In addition, the recording and reproducing apparatus 1 generates, for each predetermined recording unit (a VTS unit in the case of this example), own model/another model information indicating whether the recording unit was recorded by an apparatus of own model or an apparatus of another model and records the own model/another model information as shown in FIG. 2. Consequently, when this optical disk 51 is loaded in the recording and reproducing apparatus 1 again, it is possible to execute the judgment processing for own model/another model recording according to the processing in step S14. Details of this processing will be described later with reference to FIG. 14.

In step S22, the microcontroller 51 instructs a not-shown loading mechanism to discharge the optical disk 51. Consequently, the optical disk 51 is discharged. After the processing in step S22, the recording and reproduction processing returns to step S12 and the processing in step S12 and the subsequent steps is repeated. In other words, the recording and reproduction processing is put on standby until the optical disk is loaded again.

When power-off is instructed in step S19, the recording and reproduction processing proceeds to step S23. The microcontroller 14 executes power-off processing (processing for building down the power supply) and ends the recording and reproduction processing.

An example of a constitution of data recorded in the management table TV area (FIG. 2) will be explained.

The management table TV, the discrimination code, and the own model/another model information are recorded in the management table TV area. Specifically, the management table TV is recorded in the management table TV area and the discrimination code and the own model/another model information are recorded in the free zone of the management table TV. The management table TV is appropriately held in the RAM 43 (FIG. 1) in the processing in FIG. 4 and updated in the processing in step S20. The discrimination code and the own model/another model information are updated in the discrimination code recording processing in step S21.

FIG. 5 is a diagram showing an example of a simple constitution of the management table TV. In FIG. 5, the number of titles (the number of VTSs), start point addresses of respective VTSs, addresses of start points and end points of plural chapters included in one title (addresses of start points and end points of respective chapters) are included in the management table TV. In the case of the example in FIG. 5, the number of titles (VTSs) is two and addresses of star points of the respective titles are included in the management table TV. The two titles are "VTS#1" and "VTS#2". In the case of the example in FIG. 5, ten chapters are included in the VTS#1 and addresses of start points and end points of the respective ten chapters are included in the management table TV. Twenty chapters are included in the VTS#2 and addresses of start points and end points of the respective twenty chapters are included in the management table TV. Besides, various kinds of information such as a starting address of the guide information TE area of the extended file are also included in the management table TV. However, the information is not described.

Figure 4:
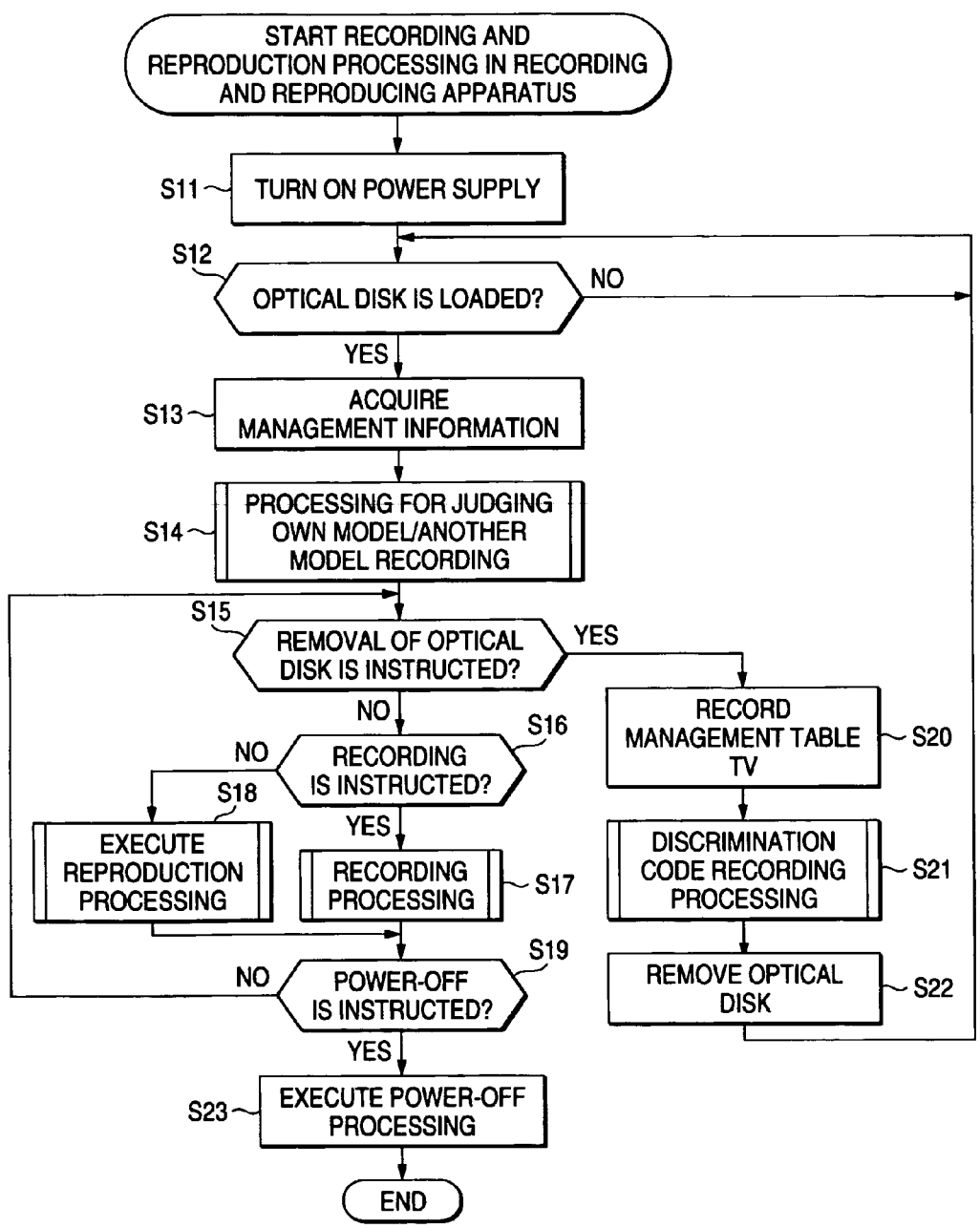
FIG. 4 is a flowchart for explaining recording and reproduction processing in the recording and reproducing apparatus in FIG. 1.
Figure 6:
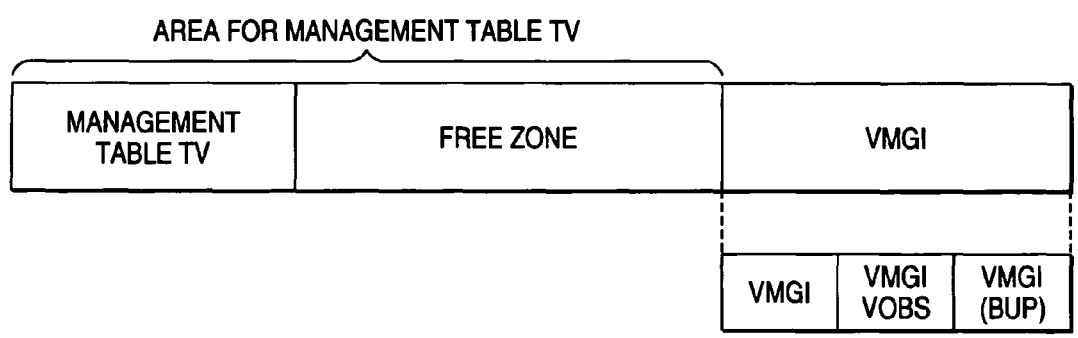
FIG. 6 is a diagram for explaining data held in a management table TV area.

FIG. 6 is a diagram showing an example of data held in the management table TV area of the memory after the recording processing in step S17 in FIG. 4 ends.

In FIG. 6, a management table TV is recorded in the area for the management table TV. The remaining area of the area for management table TV is a free zone (a free space). In the discrimination code recording processing in step S21, the microcontroller 14 generates and records a discrimination code shown in FIG. 7 on the basis of the management table TV and VMGI of a VMG in FIG. 6 and records the own model/another model information (the own model/another model information for each title) held in the built-in memory (the RAM 43 in FIG. 1). In this way, when removal of the optical disk 51 is instructed (YES in step S15), the discrimination code and the own model/another model information are recorded in the management table TV area.

Details of the judgment processing for own model/another model recording in step S14 in FIG. 4 will be explained with reference to a flowchart in FIG. 8.

In step S51, the microcontroller 14 judges whether a management table TV is present in the management table TV area of the optical disk 51. For example, the microcontroller 14 drives the thread motor 24 to move the optical head 22 to the innermost periphery of the optical disk 51 and acquires a result of reproduction on the innermost peripheral side via the signal processing unit 18 to thereby judge whether a management table TV is recorded in the optical disk 51. In recording by the recording and reproducing apparatus 1, when data is updated, a management table TV is also updated. Thus, when a management table TV is not present, this means that a recording and reproducing apparatus that performed recording processing for recording data in the optical disk 51 last is different from the recording and reproducing apparatus 1 in FIG. 1. In other words, when a management table TV is not present, it is judged that data was recorded in the optical disk 51 by an apparatus of a model different from the recording and reproducing apparatus 1 (an apparatus of another model).

When it is judged in step S51 that a management table TV is present, the judgment processing proceeds to step S52. The microcontroller 14 judges whether a discrimination code is preset in the management table TV area. For example, as shown in FIG. 7, when a discrimination code is recorded in the management table TV area, it is judged that the discrimination code is present (YES). When the optical disk 51 is removed from the recording and reproducing apparatus 1, as described concerning step S21 in FIG. 4, the discrimination code and the own model/another model information are recorded in the management table TV area. Thus, when a discrimination code is not present, it is judged that an apparatus that performed recording processing for recording data in the optical disk 51 last is an apparatus of a model different from the recording and reproducing apparatus 1.

When it is judged in step S52 that a discrimination code is present, in step S53, the microcontroller 14 reads out the discrimination code from the management table TV area of the optical disk 51. In the case of the example in FIG. 7, the microcontroller 14 reads out the discrimination code from the area for the management table TV.

Figure 9:
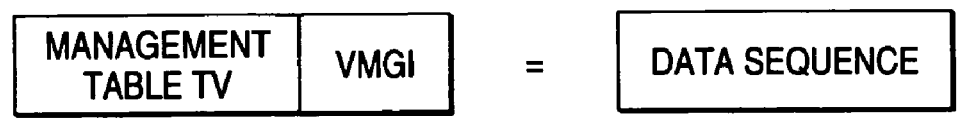
FIG. 9 is a diagram for explaining a data sequence.

In step S54, the microcontroller 14 sets the management table TV and a VMGI (see FIG. 9) in the VMG area of the optical disk 51 as a continuous data sequence. Specifically, the microcontroller 14 sets the management table TV in FIG. 7 and the VMGI of the VMG as a continuous data sequence as shown in FIG. 9. In other words, the microcontroller 14 combines data of the management table TV and data of the VMGI. In the case of the example in FIG. 9, the VMGI is added after the management table TV. However, the order may be opposite (as long as the order is decided in advance).

Figure 10:
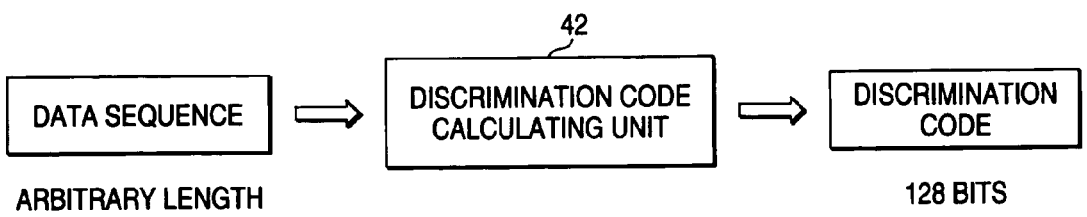
FIG. 10 is a diagram for explaining generation of a discrimination code.

In step S55, the discrimination code calculating unit 42 of the microcontroller 14 calculates a hash value of the data sequence generated in the processing in step S54 and sets the hash value as a "discrimination code". Specifically, as shown in FIG. 10, the discrimination code calculating unit 42 calculates a hash value by applying a hash function program to the data sequence formed by the management table TV and the VMGI and sets a result of the calculation as a discrimination code. As the hash function, for example, a program of an MD (Message Digest) 5 is used. The hash function program has a characteristic that the hash function program calculates a value that makes a hash value of data with an arbitrary data length to be a fixed length (e.g., 128 bits). The hash function program also has a characteristic that it is impossible to calculate the inputted data sequence (the data sequence obtained by combining the management table TV and the VMGI) from a value calculated by the hash function program (a characteristic of irreversibility). Moreover, the hash function program has a characteristic that a probability of occurrence of an output value of a hash function is uniform in a range of values that the output value can take.

In step S56, the microcontroller 14 judges whether the discrimination code read out from the optical disk 51 in the processing in step S53 and the "discrimination code'" calculated in the processing in step S55 coincide with each other. The discrimination code read out from the optical disk 51 in the processing in step S53 is recorded when the recording processing is performed by the recording and reproducing apparatus 1 last time and the optical disk 51 is removed. In this case, when data is recorded in the optical disk 51 by the recording and reproducing apparatus 1 of the same model as the recording and reproducing apparatus 1 of the last time, the discrimination code recorded in the optical disk 51 and the "discrimination code'" calculated in the processing in step S55 coincide with each other.

When it is judged in step S56 that the read-out discrimination code and the calculated discrimination code' coincide with each other, the judgment processing proceeds to step S57. The microcontroller 14 judges that an apparatus of own model recorded data in the optical disk 51 last.

In step S58, the microcontroller 14 reads out the own model/another model information for each title from the management table TV area. In other words, since an apparatus of own model recorded data in the optical disk 51 last, the microcontroller 14 judges that the own model/another model information recorded in the management table TV area is effective and reads out the own model/another model information. The microcontroller 14 reads out the own model/another model information from, for example, the management table TV area in FIG. 7. Consequently, it is possible to quickly obtain the own model/another model information for each title.

On the other hand, when it is judged in step S51 that a management table TV is not present, when it is judged in step S52 that a discrimination code is not present, or when it is judged in step S56 that the read-out discrimination code and the calculated discrimination code' do not coincide with each other, an apparatus that performed the recording processing in the optical disk 51 last time is not the recording and reproducing apparatus 1 to which the invention is applied but is an apparatus of another model, the microcontroller 14 advances the judgment processing to step S59.

In step S59, the microcontroller 14 judges that this optical disk 51 is an optical disk in which data is recorded by an apparatus of another model. For example, when data is recorded by the recording and reproducing apparatus 1 (an apparatus of own model) in the first recording processing and the discrimination code and the own model/another model information are recorded and, then, data is recorded by another recording and reproducing apparatus (an apparatus of another model) in the second recording processing, the discrimination code and the own model/another model information are not updated. Although the VMGI of the VMG is updated, the data of the management table TV is updated or not updated depending on a case. Therefore, when this optical disk 51 is loaded in the recording and reproducing apparatus 1 (the apparatus of own model) again in the third recording processing, as a result of the recording performed by the apparatus of another model in the second recording processing, at least one of the management table TV and the VMGI is different from data after the first recording processing ends. Thus, the "discrimination code'" calculated on the basis of the management table TV and the VMGI is different from the discrimination code recorded in the optical disk 51 in the first recording processing. In this way, it is possible to quickly judge whether an apparatus that recorded data in the optical disk 51 last time is an apparatus of own model or an apparatus of another model.

In step S60, the microcontroller 14 checks whether the apparatus is an apparatus of own model or an apparatus of another model for each predetermined recording unit (VTS). For example, the microcontroller 14 checks the MARK_PCK (information describing an apparatus type) in FIG. 3 recorded for each VTS (title) and checks whether the apparatus is an apparatus of own model or an apparatus of another model. In this case, the microcontroller 14 holds information indicating whether the apparatus is an apparatus of own model or an apparatus of another model for each title in the built-in memory (the RAM 43 in FIG. 1). After the processing in step S58 or after the processing in step S60, the processing is finished.

Figure 8:
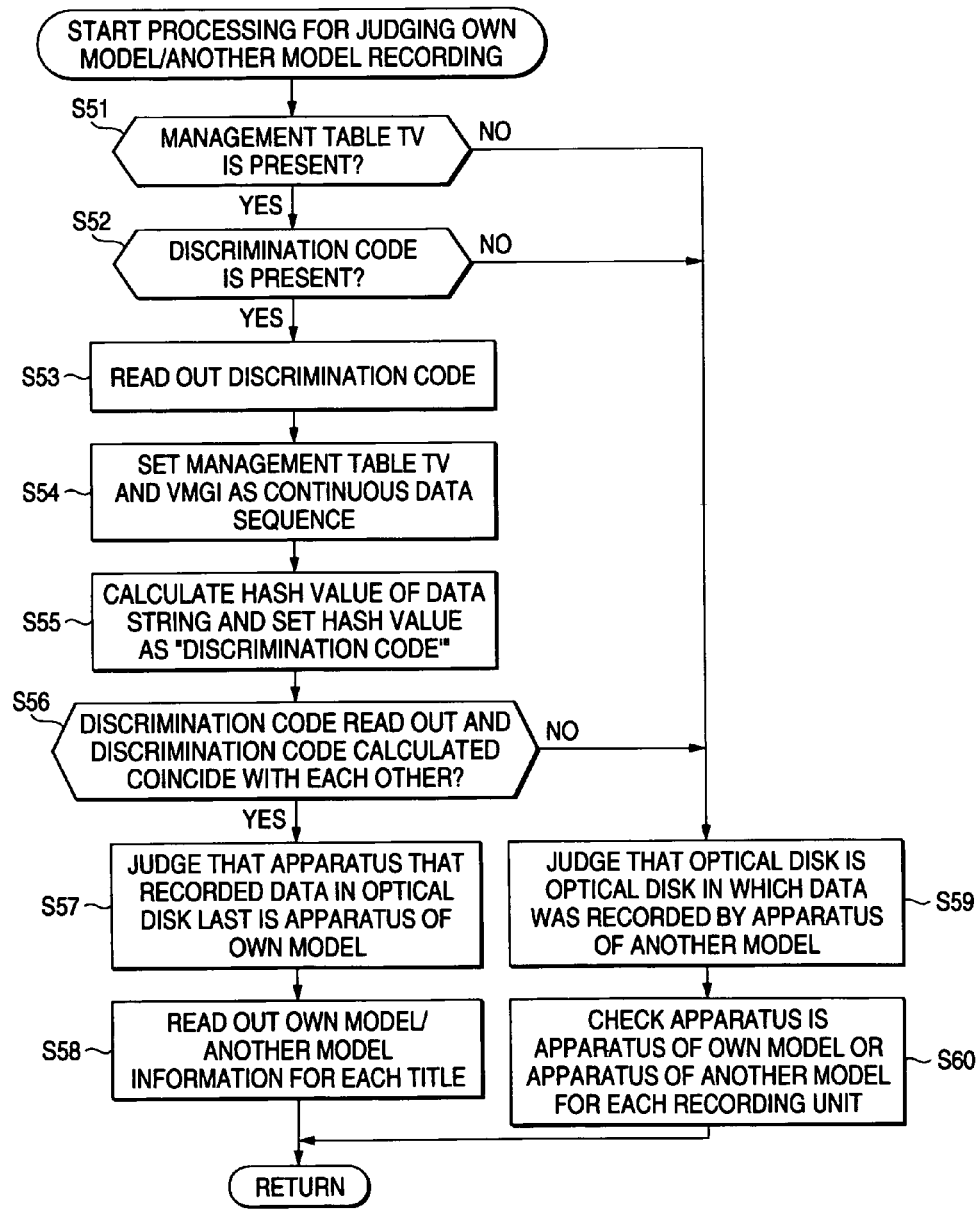
FIG. 8 is a flowchart for explaining judgment processing for own model/another model recording.

According to the processing in FIG. 8, it is possible to quickly judge whether the apparatus that recorded data in the optical disk 51 last is an apparatus of own model or an apparatus of another model. When the apparatus that recorded data in the optical disk 51 last is an apparatus of own model, it is possible to quickly judge that an apparatus of a model that performed recording processing for each predetermined recording unit of the optical disk 51 is an apparatus of own model or an apparatus of another model.

Specifically, in the case of NO in the processing in step S51, step S52, and step S56 in FIG. 8, since the apparatus that recorded data in the optical disk 51 last is not an apparatus of own model, it is checked in the processing in step S60 whether the apparatus is an apparatus of own model or an apparatus of another model for each predetermined recording unit (for each VTS in this example). However, in the case of YES in all steps S51, S52, and S56, since the apparatus that recorded data in the optical disk 51 last is an apparatus of own model, the own model/another model information is made effective. It is unnecessary to check whether the apparatus is an apparatus of own model or an apparatus of another model for each predetermined recording unit. In other words, since the processing in step S60 does not have to be executed, it is possible to more quickly judge whether the apparatus is an apparatus of own model or an apparatus of another model for each recording unit.

Details of the recording processing in step S17 in FIG. 4 will be explained with reference to a flowchart in FIG. 11.

In step S81, the microcontroller 14 judges whether the recording processing should be finalized for the optical disk 51. For example, the microcontroller 14 judges whether finalize processing is instructed by the user via the not-shown operation unit. The finalize processing is processing for completing the recording processing by updating the UDF, the VMG, the lead in, the lead out, and the like in FIG. 2.

When it is judged in step S81 that the recording processing should not be finalized, in step S82, the image data inputting unit 11 and the sound data inputting unit 12 receives an input of data to be recorded. For example, image data and sound data captured by a not-shown imaging unit and a not-shown speaker are received.

In step S82, the microcontroller 14 controls the respective units to convert the input data into recording data according to a recording format. As a specific example, the microcontroller 14 controls the compression and expansion processing unit 13 (the image processing unit 31 and the sound processing unit 32) to compress the image data and the sound data and subject the image data and the sound data to time division multiplexing. The microcontroller 14 controls the header information processing unit 17 to add header information peculiar to the optical disk 51, header information of an extended file, and the like to the data. The microcontroller 14 controls the signal processing unit 18 to apply, after an error correction code is added to the time-division-multiplexed data added with the headers, interleave processing and encoding processing to the data. In this way, the input data is converted into recording data.

In step S83, the microcontroller 14 records the recording data in a disk. Specifically, a light quantity of a laser beam irradiated from the optical head 22 on the optical disk 51 in accordance with the recording data is raised by the analog front end unit 20. Consequently, pit rows are sequentially formed on the optical disk 51 and image data formed by a moving picture is sequentially recorded in the optical disk 51. In this case, the microcontroller 14 appropriately updates the data of the management table TV held by the built-in memory (the RAM 43) as well and also updates the management table TV in the management table TV area of the optical disk 51 (FIG. 7).

In step S85, the own model/another model information generating unit 41 of the microcontroller 14 updates the own model/another model information with respect to the built-in memory (the RAM 43 in FIG. 1) of the microcontroller 14. Since the own model/another model information is updated for each predetermined recording unit, this processing is skipped when the own model/another model information is not recorded yet for the predetermined recording unit. In this embodiment, the own model/another model information is updated for each title. In general, recording by an apparatus of own model and recording by an apparatus of another model are not performed in one title, the own model/another model information is updated for each title.

In step S86, the microcontroller 14 judges, on the basis of operation on the not-shown operation unit by the user, whether the recording should be ended. When it is judged that the recording should not be ended, the recording processing returns to step S82 and the processing in step S82 and the subsequent steps are repeated. In other words, an input of data to be recorded is received again, recording data is recorded in the optical disk 51, and the processing for updating the own model/another model information in the built-in memory is appropriately repeated until end of the recording processing is instructed.

When it is judged in step S86 that the recording should be ended, the recording processing proceeds to step S87. The microcontroller 14 executes end processing. In this case, when the data to be recorded is data for recording of a moving picture in the processing in step S82 and the subsequent steps, in step S87, recording of actual data is completed, whereby recording of a VTSTT VOBS is completed and a VTSI BUP, a VTSI, and VTSM VOBS are sequentially formed. Consequently, recording of one VTS is completed. In this way, in the recording and reproducing apparatus 1, when stop of the recording is instructed by the user, the series of processing in the compression and expansion processing unit 13 and the like are controlled to be stopped by the microcontroller 14 and the recording of image data is stopped. Subsequently, management information of a file formed by a moving picture recorded in this way is recorded in the optical disk. In other words, in the recording and reproducing apparatus 1, management information is generated by the microcontroller 14 according to position information of a moving picture, information on a file size, and information such as recording date and time. To record the management information following the image data, this management information is outputted to the signal processing unit 18 and recorded in the optical disk 51. Consequently, an area of the VTSI BUP is formed. Subsequently, areas for generating the following VTSI of a VTS and VTSM VOBS is secured by padding. The optical head 22 seeks the areas of the VTSI and the VTSM VOBS secured earlier. In this area, the same management information is outputted to the signal processing unit 18 and recorded in the optical disk 51. Consequently, areas of the VTSI and the VTSM VOBS are formed. In the recording and reproducing apparatus 1, image data formed by a moving picture is recorded for one title. Consequently, in the recording and reproducing apparatus 1, when a file formed by a moving picture is recorded, the management information and the file are recorded according to a DVD video format that is a format in which management information based on the VTSI, management information based on the VTSM VOBS, a file, and management information based on the VTSI BUP continue. In the recording and reproducing apparatus 1, when recording of a moving picture is subsequently instructed by the user, titles are sequentially recorded in the optical disk 51 according to repetition of the same processing.

On the other hand, when data to be recorded is data for recording of a still picture in the processing in step S82 and the subsequent steps, still picture data obtained at predetermined timing is recorded. In step S87, an extended file formed by a still picture file is recorded and the intermediate management information DK and the like are recorded. Specifically, when the optical disk 51 is a virgin disk, image data formed by a still picture inputted by the image data inputting unit 11 is compressed by the image processing unit 31 of the compression and expansion processing unit 13 according to the standard of JPEG and recorded. In the recording and reproducing apparatus 1, in the recording of a moving picture, first, areas of a VTSI and a VTSM VOBS are secured to record actual data. On the other hand, in the recording of a still picture, returning to a top of an area secured by padding, actual data formed by the still picture is recorded without securing such areas. When recording of the following still picture is instructed by the user, the following still picture is recorded in the optical disk 51 in the same manner. A recording position and the like of each file is recorded in the memory every time the recording is performed.

In the recording and reproducing apparatus 1, when files formed by still pictures are recorded in the optical disk by a desired number and stop of the recording of the still pictures is instructed according to switching or the like of an operation mode by the user, management information formed by the recording positions and the like held in the memory is recorded for the plural files in the following area as the temporary intermediate management information DK until finalize. Consequently, in the recording and reproducing apparatus 1, when files other than a moving picture are recorded, the files and management information are recorded in an order of a file and a management information corresponding to the file. A recording format of the files and the management information is switched according to an attribute of a file to be recorded.

In the recording and reproducing apparatus 1, such intermediate management information DK (FIG. 2) is collected in the plural files continuously recorded and management information for managing the entire files is recorded. Then, individual information indicating top positions and file names of the respective files is recorded and formed. A starting address of this intermediate management information DK is recorded in a fixed area on the inner peripheral side of the optical disk 51 as guide information TE of an extended file. A recording position information of the guide information TE of the extended file is recorded in the management table TV.

Consequently, according to the recording and reproducing apparatus 1 that also supports such files other than a moving picture, it is possible to reproduce a file of a still picture. In other words, when such an optical disk 51 is loaded, in the recording and reproducing apparatus 1, not only the data of the VTS and the VTSM VOBS but also the intermediate management information DK of a still picture file is reproduced from the optical disk 51 according to the search of the optical disk 51 based on a management table and held in the memory of the microcontroller 14. Consequently, for example, it is possible to provide the user with titles and the like of moving pictures and still pictures recorded in the optical disk 51 according to an instruction of the user. When the user instructs reproduction of a moving picture, it is possible to reproduce a moving picture file corresponding thereto according to the data of the VTS and the VTSM VOBS in a manner same as the manner described above concerning the read-only optical disk.

On the other hand, when it is judged in step S81 that the recording processing should be finalized, the recording processing proceeds to step S88. The microcontroller 14 generates a UDF and a VMG. Specifically, the microcontroller supplies the management information acquired from the optical disk 51 on the basis of the management table TV and held in the built-in memory, the management information created according to the records of moving pictures and still pictures and held in the memory, and the intermediate management information to the header information processing unit 17. The microcontroller 14 causes the header information processing unit 17 to generate data of a UDF for a computer. The microcontroller 14 supplies management information for a moving picture file to the header information processing unit and causes the header information processing unit 17 to generate VMG data for a DVD player.

In step S89, the microcontroller 14 controls the respective units to record the UDF and the VMG generated in the optical disk 51. The UDF and the VMG are recorded in an inner peripheral side area secured in the optical disk 51 and a lead in and a lead out are formed. Consequently, this optical disk 51 is set to be playable in a DVD player applicable only to the usual DVD format. After the processing in step S87 or after the processing in step S89, the recording processing ends.

Figure 11:
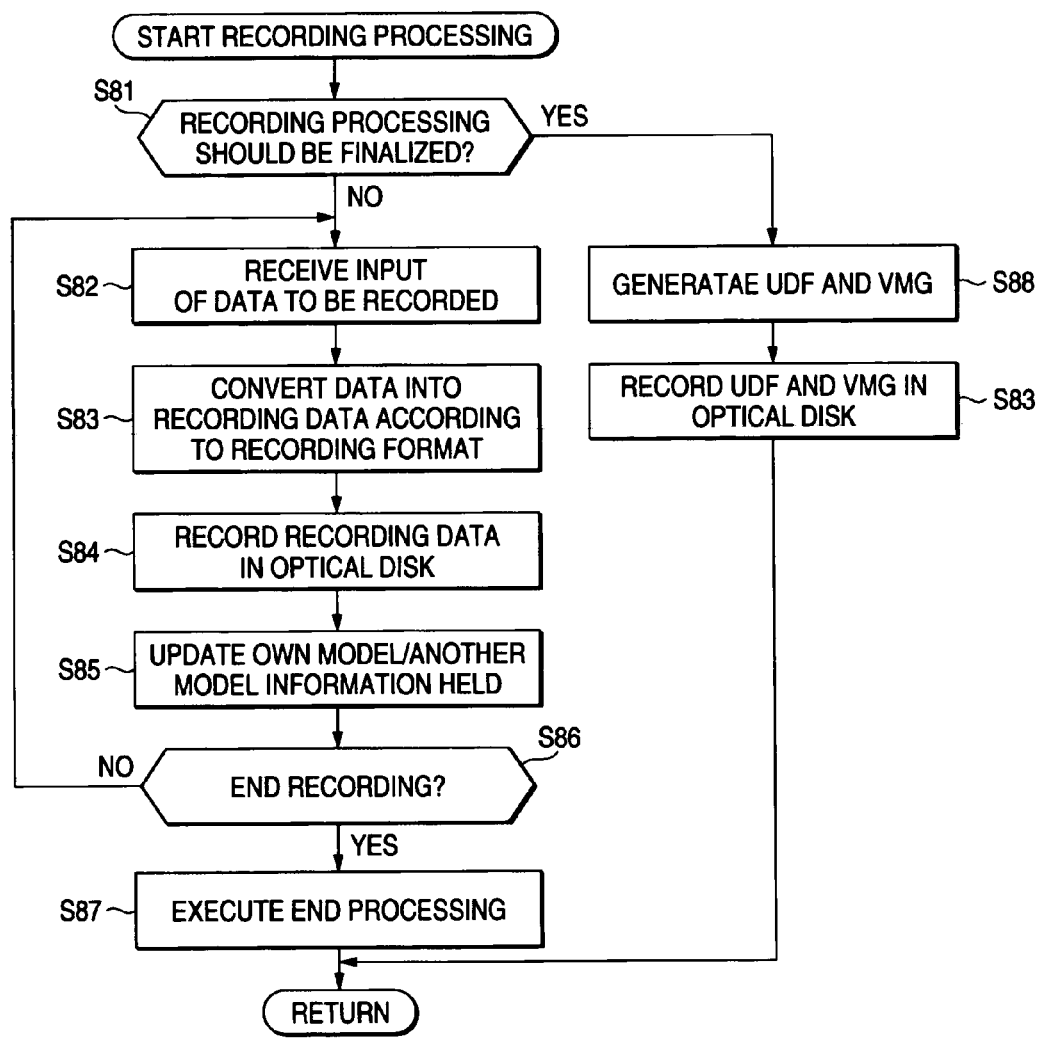
FIG. 11 is a flowchart for explaining recording processing.

According to the processing in FIG. 11, data is recorded in the optical disk 51 and the own model/another model information held in the RAM 43 built in the microcontroller is appropriately updated. When the recording processing is finalized, it is possible to set the optical disk 51 to be playable even in a DVD player applicable only to the usual DVD format.

Figure 12:
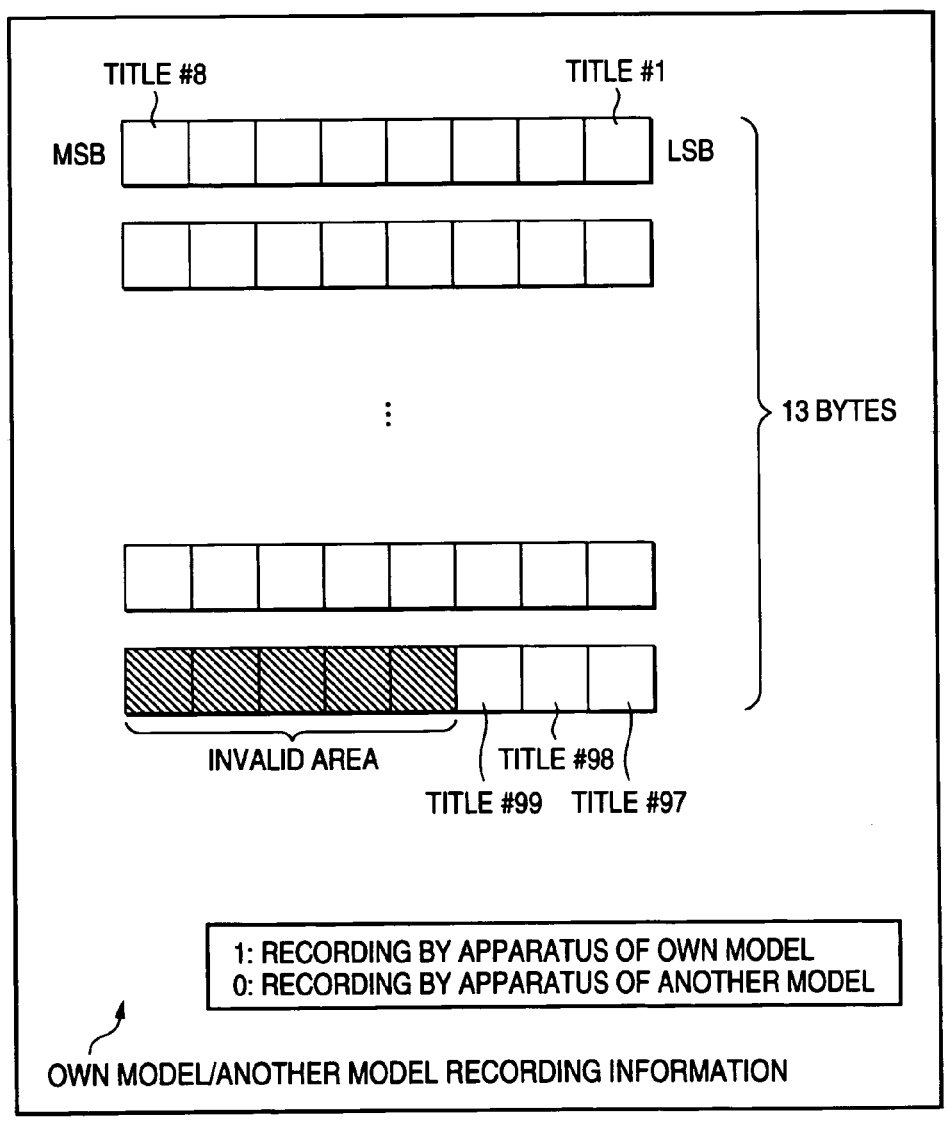
FIG. 12 is a diagram for explaining own model/another model information.

An example of the own model/another model information updated in the processing in step S85 in FIG. 11 will be explained with reference to FIGS. 12 and 13. FIG. 12 shows a state in which no data is recorded in a data area for the own model/another model information.

In the DVD video format, it is possible to record ninety-nine titles (VTSs) on one disk. An area with a 99-bit length is required to leave information indicating whether recording is recording by an apparatus of own model or recording by an apparatus of another model for each of the titles in the ninety-nine titles. Since 1 byte includes 8 bits, in the example in FIG. 12, an area of 13 bytes is prepared. In FIG. 12, an area for a first title (referred to as title #1) to an eighth title (referred to as title #8) is secured in a first row. An area for a ninth title (referred to as title #9) to a sixteenth title (referred to as title #16) is secured in a second row. Similarly, an area for a ninety-seventh title (referred to as title #97) to a ninety-ninth title (referred to as title #99) is secured in a thirteenth row. Areas after the title #99 in the thirteenth row are set as invalid areas.

In FIG. 12, when a certain title is recorded by an apparatus of own model, a value of a bit of an area corresponding to the title is set to 1. When the title is recorded by an apparatus of another model, a value of a bit of an area corresponding to the title is set to 0. Consequently, even in an optical disk in which recording by an apparatus of own model and recording by an apparatus of another model are performed in a mixed state, if an apparatus that records data last is an apparatus of own model, it is possible to quickly learn, when the optical disk is loaded after that, whether recording is recording by an apparatus of own model or recording by an apparatus of another model in all recording units from contents of the own model/another model information of the management table TV area.

For example, in FIG. 12, it is assumed that the title #1 to the title #9 (the VTS #1 to the VTS #9 in FIG. 2) are recorded when the recording and reproducing apparatus 1 in FIG. 1 executes the recording processing in FIG. 11. In this case, the own model/another model information generating unit 41 updates the own model/another model information stored in the RAM 43 according to repetition of the processing in step S85 in FIG. 11.

Figure 13:
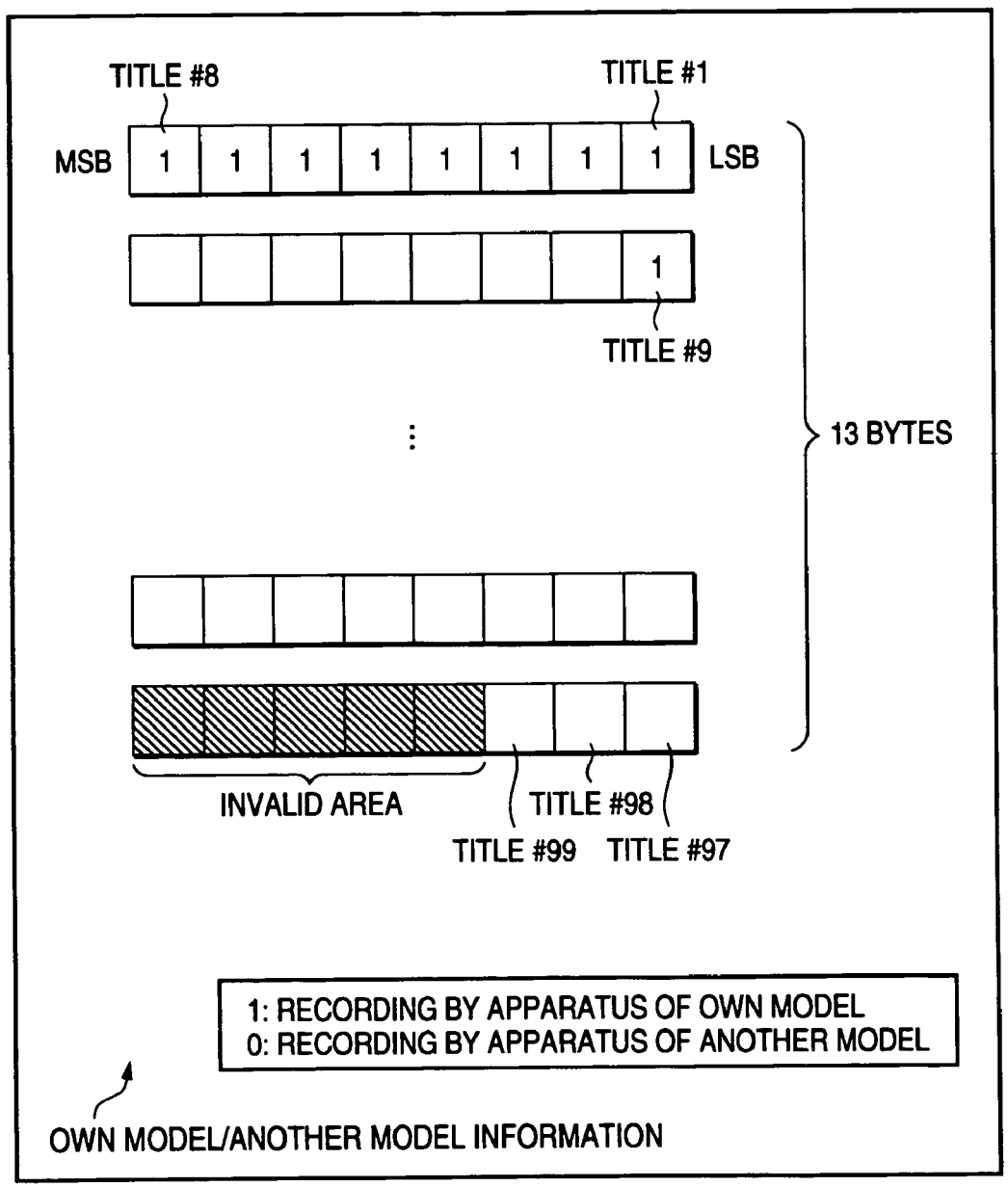
FIG. 13 is a diagram for explaining own model/another model information.

As a result of the update of the own model/another model information up to the title #9, as shown in FIG. 13, flags (1) indicating that recording was performed by an apparatus of own model are stored in storage areas corresponding to the title #1 to the title #9 of the own model/another model information. In this way, the own mode/another model information is updated for each of the titles.

In this embodiment, a flag indicating whether recording is recording by an apparatus of own model or recording by an apparatus of another model is provided for each of the titles. However, the invention is not limited to this. The flag indicating whether recording is recording by an apparatus of own model or recording by an apparatus of another model may be provided for each predetermined recording unit.

Details of the discrimination code recording processing in step S21 in FIG. 4 will be explained with reference to a flowchart in FIG. 14.

In step S111, the discrimination code calculating unit 42 of the microcontroller 14 reads a VMGI and a management table TV effective at that point. The discrimination code calculating unit 42 of the microcontroller 14 reads the VMGI of the VMG in FIG. 6 and, for example, the data of the management table TV held in the RAM 43 of the microcontroller 14 (or the data of the management table TV read out from the optical disk 51). The data of the (effective) management table TV to be read at this point is data of a latest management table TV.

In step S112, the discrimination code calculating unit 42 of the microcontroller 14 sets the VMGI and the management table TV read out as a continuous data sequence. Specifically, as shown in FIG. 9, the discrimination code calculating unit 42 sets the data of the management table TV and the data of the VMGI as a continuous data sequence.

In step S113, the discrimination code calculating unit 42 of the microcontroller 14 calculates a hash value of the data sequence and sets the hash value as a discrimination code. For example, as shown in FIG. 10, the discrimination code calculating unit 42 calculates a hash value by applying a hash function program to the data sequence (the data sequence including the data of the management table TV and the data of the VMGI) and sets a result of the calculation as a discrimination code. Although the data sequence has an arbitrary length, as a result of the calculation according to the hash function program, the discrimination code has a fixed length.

In step S114, the microcontroller 14 writes the own model/another model information for each of the titles, which is appropriately updated in the RAM 43 by the own model/another model information generating unit 41, and the discrimination code, which is generated in the processing in step S113, in the free zone of the management table TV area. Specifically, the microcontroller 14 writes the own model/another model information for each of the titles, which is appropriately updated by the own model/another model information generating unit 41 in step S85 in FIG. 11, and the discrimination code, which is calculated by the discrimination code calculating unit 42 in the processing in step S113, in the free zone of the area for the management table TV in FIG. 6. Consequently, as shown in FIG. 7, the discrimination code and the own model/another model information are recorded in the management table TV area. After the processing in step S114, the discrimination code recording processing is ended.

Figure 14:
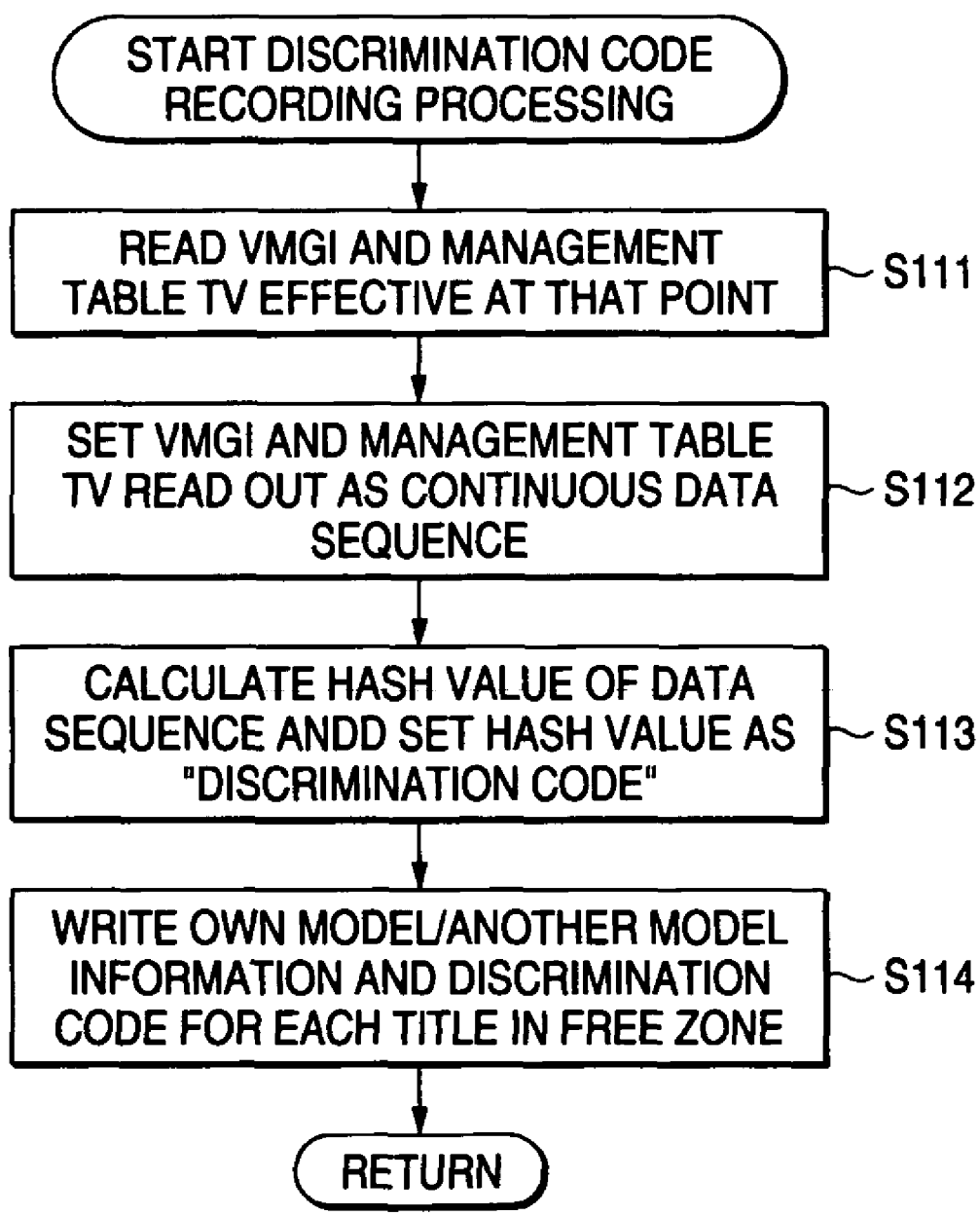
FIG. 14 is a flowchart for explaining discrimination code recording processing.

According to the processing in FIG. 14, when the optical disk 51 is removed from the recording and reproducing apparatus 1, the discrimination code is recorded in the optical disk 51 on the basis of the VMGI and the management table TV. The own model/another model information indicating whether the respective titles are recorded by an apparatus of own model is also recorded in the optical disk 51. Consequently, when the optical disk 51 is loaded in the recording and reproducing apparatus 1 again (step S14 in FIG. 4), it is possible to judge whether an apparatus that recorded data in the optical disk 51 last is an apparatus of own model. When the apparatus that recorded data in the optical disk 51 last is an apparatus of own model, it is possible to quickly judge whether the respective titles are recorded by the apparatus of own model by referring to the own model/another model information.

According to the above description, in the recording and reproducing apparatus 1 for the removable optical disk 51, when data is written (recorded) in the optical disk 51, it is possible to judge, by adding a discrimination code indicating that an apparatus of own model wrote the data to the data and recording the data, at high speed whether the loaded optical disk 51 is a medium in which data was recorded (last) by an apparatus of own model or recorded (last) by an apparatus of another model.

Even when data is written in one optical disk 51 by apparatuses of plural models, it is possible to quickly judge whether an apparatus that wrote data in the optical disk 51 last is an apparatus of own model or an apparatus of another model by referring to the discrimination code. Moreover, since the own model/another model information is recorded together with the discrimination code, when the discrimination code and a discrimination code calculated coincide with each other (i.e., the discrimination code is effective) when the optical disk 51 is loaded, it is possible to quickly check, for each recording unit, whether recording is recording by an apparatus of own model or recording by an apparatus of another model by referring to the own model/another model information.

Moreover, when the discrimination code calculating unit generates a discrimination code, an amount of information is compressed using a hash function. Thus, it is possible to set an amount of information of the discrimination code small compared with an amount of information of an input value (in this embodiment, a data quantity of the data of the management table TV and the data of the VMGI). Since the discrimination code is calculated using the hash function, it is possible to set a length of a storage area for the discrimination code to a fixed length. Moreover, since an input value (a data sequence) for calculating a discrimination code using the hash function is generated on the basis of a part of the data recorded in the optical disk 51, it is possible to reduce a probability of error in judgment on whether recording is recording by an apparatus of own model or recording by an apparatus of another model.

It is possible to quickly determine whether an apparatus that recorded data in the loaded optical disk 51 last is an apparatus of own model or an apparatus of another model. Moreover, it is possible to learn at high speed (compared with time for sequentially checking data of the respective titles), for each predetermined recording unit (title), whether recording is recording by an apparatus of own model or recording by an apparatus of another model.

Since it is possible to quickly learn whether recording is recording by an apparatus of own model or recording by an apparatus of another model, it is possible to reduce entire recognition time at the time when the optical disk 51 is loaded.

According to the reduction of time for recognizing the optical disk 51, for example, it is possible to reduce time required until start of reproduction or recording after the disk is inserted in the recording and reproduction apparatus 1. Therefore, operability of the recording and reproducing apparatus 1 can be improved.

Summaries of the examples described above are described below.

In the recording and reproducing apparatus 1, after recording of data in the optical disk 51 is completed (after the processing in step S17 in FIG. 4), when removal of the optical disk 51 is instructed (YES in step S15 in FIG. 4), a discrimination code is generated on the basis of data of the management table TV and data of the VMGI of the VMG and recorded in the free zone of the management table TV area of the optical disk 51 to remove the optical disk 51. As a specific example of the generation of the discrimination code, the recording and reproducing apparatus 1 generates a discrimination code by calculating a hash value of a data sequence including the data of the management table TV and the data of the VMGI of the VMG of the optical disk 51. When the optical disk 51 with the data recorded therein is loaded in the recording and reproducing apparatus 1 again (e.g., YES in step S12 in FIG. 4), the recording and reproducing apparatus 1 judges, on the basis of the data of the management table TV area of the optical disk 51, whether an apparatus recorded data in the loaded optical disk 51 last is an apparatus of own model (step S14 in FIG. 4). Specifically, the recording and reproducing apparatus 1 calculates a hash value of the data sequence including the data of the management table TV and the data of the VMGI of the VMG of the optical disk 51 to calculate a "discrimination code'". When the "discrimination code'" calculated and the discrimination code recorded in the management table TV area of the optical disk 51 coincide with each other, the recording and reproducing apparatus 1 judges that an apparatus that wrote (or edited) data in the optical disk 51 last is an apparatus of own model.

In this case, it is assumed that, after the recording and reproducing apparatus 1 (assumed to be a recording and reproducing apparatus A) records the discrimination code in the free zone of the management table TV area of the optical disk 51 in first recording processing (deletion processing or edition processing) and the optical disk 51 is removed, a recording and reproducing apparatus of another model (assumed to be a recording and reproducing apparatus B) does not rewrite the free zone of the management table TV area (i.e., the discrimination code and the own model/another model information) in second recording processing (deletion processing or edition processing). In this case, even if there is no change in the area other than the data of the management table TV of the management table TV area (i.e., the free zone in FIG. 6), contents of at least one of the management table TV and the VMGI change (only the management table TV changes, only the VMGI changes, or both the management table TV and the VMGI change). Therefore, when the optical disk 51 is loaded in the recording and reproducing apparatus 1 (the recording and reproducing apparatus A) again, in the recording and reproducing apparatus 1 (the recording and reproducing apparatus A), the "discrimination code'" calculated from the management table TV and the VMGI of the optical disk 51 at the point when the optical disk 51 is removed from the recording and reproducing apparatus B (the discrimination code calculated in step S55) and the discrimination code recorded in the free zone of the management table TV area (the discrimination code read out in step S53) are different. Therefore, the recording and reproducing apparatus 1 (the recording and reproducing apparatus A) judges that an apparatus that recorded data in this optical disk 51 last is an apparatus of another model.

In the recording and reproducing apparatus B that is constituted to update contents of the management table TV of the optical disk 51, contents of the management table TV change when addition, deletion, edition, and the like of data is applied to the optical disk 51. Therefore, in this embodiment, it is possible to prevent accidental coincidence (misjudgment) of discrimination codes by generating a discrimination code on the basis of contents of the management table TV and the VMGI on the DVD video format and recording the discrimination code.

For example, it is assumed that the recording and reproducing apparatus B of another model rewrites the free zone of the management table TV area (i.e., the discrimination code and the own model/another model information) in the second recording processing (deletion processing or edition processing). In this case, the discrimination code written by the recording and reproducing apparatus 1 (the recording and reproducing apparatus A) in the first recording processing is lost. Therefore, when the optical disk 51 is loaded in the recording and reproducing apparatus 1 (the recording and reproducing apparatus A) again after the second recording processing, the recording and reproducing apparatus 1 (the recording and reproducing apparatus A) judges that the discrimination code is not present (No in step S52 in FIG. 8) and judges that data was recorded in the loaded optical disk 51 by an apparatus of another model last (step S59).

When the recording and reproducing apparatus B is a recording and reproducing apparatus that is adapted not to update contents of the management table TV, the management table TV is not present on the optical disk 51 or the management table TV is not updated and keeps contents at the time when the optical disk 51 is removed from the recording and reproducing apparatus 1 (the recording and reproducing apparatus A). When the management table TV is not present on the optical disk 51, it is possible to easily judge that data was recorded in the optical disk 51 by an apparatus of another model (step S51). Even when the recording and reproducing apparatus B does not update the management table TV, contents of the VMGI is updated by the recording and reproducing apparatus B. Therefore, the discrimination code calculated from the management table TV and the VMGI and the discrimination code recorded in the free zone of the management table TV area are different. Consequently, the recording and reproducing apparatus 1 (the recording and reproducing apparatus A) can surely judge that data was recorded in the optical disk 51 by an apparatus of another model last.

When an apparatus that recorded data in the optical disk 51, which was loaded in the recording and reproducing apparatus 1 (the recording and reproducing apparatus A) again, last is a recording and reproducing apparatus of another model (e.g., the recording and reproducing apparatus B), the recording and reproducing apparatus 1 performs processing for determining, for each predetermined recording unit such as a title or a chapter, whether recording is recording by an apparatus of own model or recording by an apparatus of another model (step S60 in FIG. 8). Specifically, the recording and reproducing apparatus 1 checks, for each recording unit, whether the recording unit was recorded by an apparatus of own model or recorded by an apparatus of another model by referring to a stream or information recorded in management information. For example, the recording and reproducing apparatus 1 checks whether recording is recording by an apparatus of own model with reference to the MARK_PCK (FIG. 3) described for each VTS. The own model/another model information indicating whether recording is recording by an apparatus of own model or recording by an apparatus of another model for each recording unit is stored (held) in the RAM 43 (FIG. 1) built in the microcontroller 14 and recorded in the free zone of the management table TV area of the optical disk 51 in the discrimination code recording processing (step S114 in FIG. 14). In this embodiment, the own model/another model information is written in the optical disk 51 at timing of step S114 in FIG. 14. However, the invention is not limited to this. The own model/another model information may be written in the optical disk 51 at the time of update of the management table TV (e.g., the processing in step S20 in FIG. 4).

In this way, the own model/another model information is recorded in the management table TV area together with the discrimination code. Thus, even if recording by an apparatus of own model and recording by an apparatus of another model are mixed in the optical disk 51, if a recording and reproducing apparatus that performed recording processing last is an apparatus of own model, it is possible to quickly learn whether recording is recording by an apparatus of own model or recording by an apparatus of another model in all recording units of the optical disk 51 from contents of the free zone of the management table TV at the time when the optical disk 51 is loaded after that.

When the data of the management table TV and the data of the VMGI themselves are recorded in the free zone of the management table TV area, a quantity of the data exceeds the area of the free zone. However, since the data of the management table TV and the data of the VMGI are compressed rather than being directly recorded, it is possible to record compressed data (the discrimination code) in the free zone of the management table TV area.

The recording and reproducing apparatus 1 uses a hash function program for generation of a discrimination code. Consequently, it is possible to include a larger amount of information in the discrimination code. For example, entire data recorded in the optical disk 51 (data of the entire real time data recording area) may be set as an object to be calculated by the hash function program. In this way, it is possible to set a larger amount of information as a data sequence for which a discrimination code is generated. Thus, when edition is applied to the optical disk 51 (e.g., recording after deletion), it is possible to reduce a probability of accidental coincidence of discrimination codes before the edition and after the edition.

The discrimination code calculating unit 42 calculates a discrimination code using the hash function program. However, a function for the calculation is not limited to this. Although a hash function is an irreversible compression function, the function may be a reversible compression function or an irreversible compression function. Other function programs may be used as long as functions compress an input value (the data sequence of the management table TV and the VMGI). However, taking into account the fact that a free area or a reserved area of an existing format of the optical disk 51 is used, it is desirable that a result of compression is fixed-length data. In other words, the discrimination code calculating unit 42 only has to calculate a discrimination code by applying a function for reducing a data quantity to be smaller than that of data to be an object of calculation (data that changes every time the data is recorded). In this way, by applying a predetermined function to data that changes every time the data is recorded in the optical disk 51, the discrimination code calculating unit 42 calculates a discrimination code indicating that the recording and reproducing apparatus 1 recorded data in the optical disk 51. Thus, it is possible to easily judge whether a recording and reproducing apparatus that recorded data in the optical disk 51 last is an apparatus of own model or an apparatus of another model.

An input value to the discrimination code calculating unit 42 is not limited to the data sequence including the management table TV and the VMGI. The input value may be a data sequence including the management table TV, the VMGI, and the own model/another model information, may be all data recorded on the optical disk 51, or may be apart of data recorded on the optical disk 51 different from the management table TV and the VMGI (specific information on the optical disk 51). In this case, it is desirable that data to be compressed (for calculating a discrimination code) is data on the optical disk 51 that changes every time recording, deletion, and edition processing is performed. It is desirable to use a function (a compression function) from which a different output value is obtained with respect to a different input value.

From such a viewpoint, in this embodiment, the hash function is used as a function for calculating a discrimination code. This is because, in general, a probability of occurrence of an output value of the hash function is uniform in a range of values that the output value can take and it is possible to bring possibility of accidental coincidence of output values for different inputs (the management table TV and the VMGI in this embodiment) as close as possible to zero by using a function with a wide range of output values (e.g., a function that outputs 128 bits).

When information is compressed using a hash function (a hash value is calculated), it is impossible to restore data of the information. However, in the invention, since determination is performed by comparing hash values as discrimination codes, it does not matter even if data before calculation is not obtained from data after compression.

When data is written in the optical disk 51 according to JP-A-2003-331563, a VMGI is not recorded in the optical disk 51 in some cases. However, in such cases, data substituting for data of the VMGI (e.g., NULL data) only has to be used. Even in such a case, since a discrimination code is generated on the basis of the data recorded on the optical disk 51, it is possible to reduce a probability of misjudgment on whether recording is recording by an apparatus of own model or recording by an apparatus of another model.

In this way, according to the recording and reproducing apparatus 1 in FIG. 1, it is possible to judge whether data was recorded in a loaded optical disk (a DVD) by an apparatus of the same model as the recording and reproducing apparatus 1 (an apparatus of own model) last. Thus, for example, it is possible to inform the user that the optical disk is a disk in which data was recorded by an apparatus of another model.

In the explanations of the examples, the recording and reproducing apparatus 1 records data in the optical disk 51. However, a recording medium is not limited to the optical disk 51. Other recording media such as a magneto-optical disk, a memory card, and a memory stick (trademark) may be used.

In the examples, a discrimination code is recorded in a disk when the disk is removed. However, the discrimination code may be recorded in the disk every time recording processing (e.g., the processing in step S17) is ended once even if the disk is not removed.

In this embodiment, the recording and reproducing apparatus 1 that executes recording processing and reproduction processing is explained. However, a recording apparatus that executes only the recording processing and a reproducing apparatus that executes only reproduction processing may be separately provided. In this case, the recording apparatus executes processing other than the processing for reproduction in FIG. 4 (e.g., the processing in step S18). The reproducing apparatus executes processing other than the processing for recording in FIG. 4 (e.g., the processing in steps S17, S20, and S21).

It is also possible to cause hardware to execute the series of processing or cause software to execute the series of processing. In this case, the series of processing is executed by a personal computer 250 shown in FIG. 15.

Figure 15:
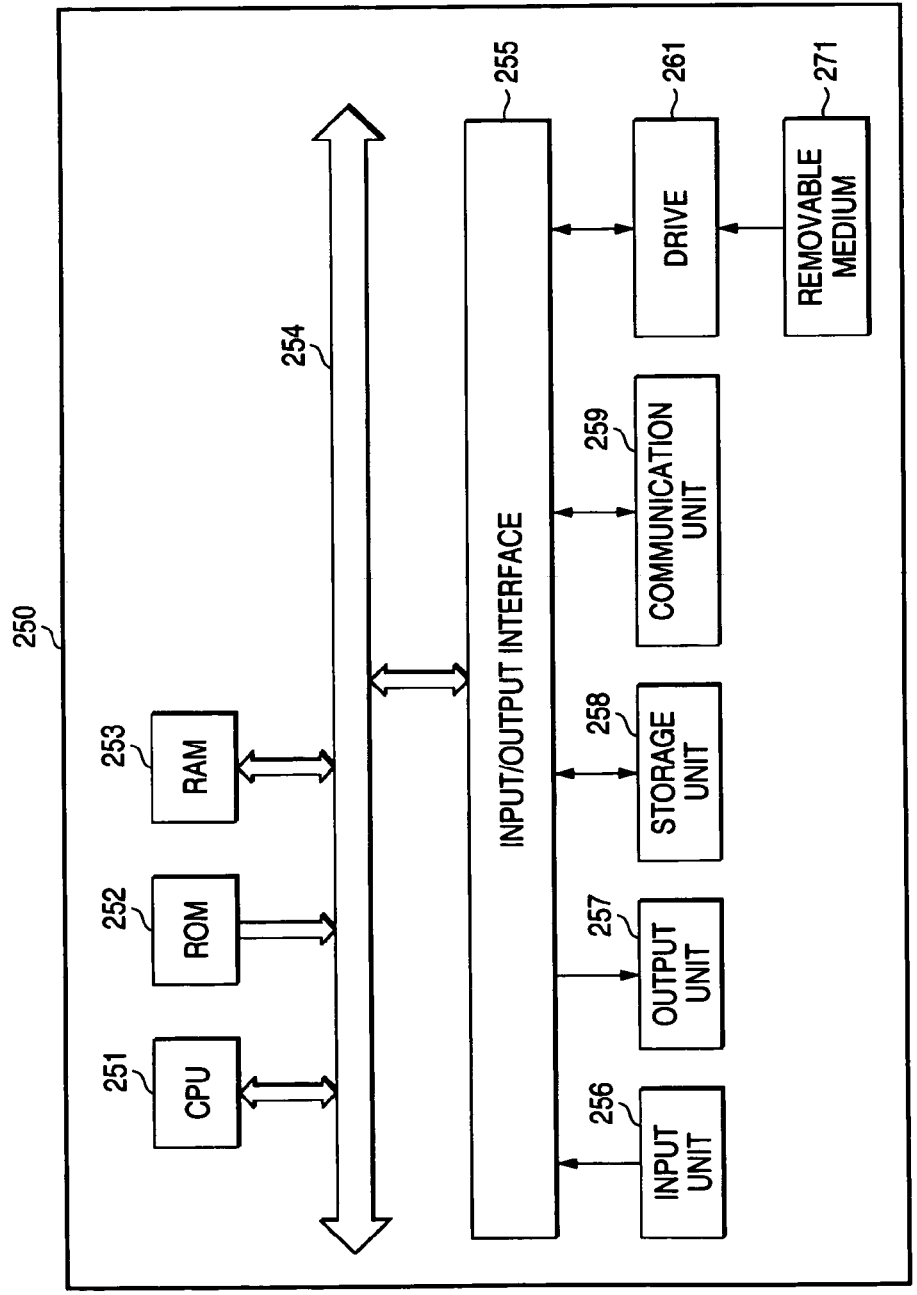
FIG. 15 is a diagram showing an example of a constitution of a personal computer.

In FIG. 15, a CPU 251 executes various kinds of processing in accordance with programs stored in a ROM 252 or programs loaded in a RAM 253 from a storing unit 258. Data and the like required by the CPU 251 in executing the various kinds of processing are appropriately stored in the RAM 253 as well.

The CPU 251, the Rom 252, and the RAM 253 are connected to one another via an internal bus 254. An input/output interface 255 is also connected to the internal bus 254.

An input unit 256 consisting of a keyboard, a mouse, or the like, a display consisting of a CRT, an LCD, or the like, an output unit 257 consisting of a speaker or the like, a storing unit 258 constituted by hard disk or the like, and a communication unit 259 constituted by a modem, a terminal adapter, or the like are connected to the input/output interface 255. The communication unit 259 performs communication processing via various networks including a telephone line and a CATV.

A drive 261 is also connected to the input/output interface 255 as required. A removable medium 271 consisting of a magnetic disk, an optical disk, a magneto-optical disk, a semiconductor memory, or the like is appropriately mounted on the drive 261. A computer program read out from the removable medium 271 is installed in the storing unit 258 as required.

When the personal computer 250 causes software to execute the series of processing, a program constituting the software is installed from a network or a recording medium.

As shown in FIG. 15, this recording medium is not only constituted by a package medium consisting of the removable medium 271 having a program recorded therein that is distributed separately from the computer in order to provide the user with the program but also constituted by a hard disk including the ROM 252 or the storing unit 258 having the program recorded therein that is provided to the user in a state in which the hard disk is built in an apparatus body in advance.

In this specification, the steps describing computer programs include not only processing that is performed in time series in accordance with a described order but also processing that is executed in parallel or individually even if not being necessarily processed in times series.

In this specification, the system represents an entire apparatus constituted by plural apparatuses.

The invention claimed is:

1. A recording apparatus that records a first data in a recording medium, the recording apparatus comprising:
   a recording unit that records the first data in the recording medium;
   a generating unit that generates a second data indicating a model of the recording apparatus; and
   a calculating unit that applies a predetermined function to a third data, which is included in the first data recorded in the recording medium by the recording unit and changes every time the first data is recorded in the recording medium by the recording unit, to calculate a discrimination code indicating that the recording apparatus recorded the first data in the recording medium,
   wherein the recording unit further records the discrimination code calculated by the calculating unit, the third data, and the second data generated by the generating unit in the recording medium.

2. A recording apparatus according to claim 1, wherein the calculating unit calculates the discrimination code by applying a function for reducing an amount of data to be smaller than the third data to the third data.

3. A recording apparatus according to claim 2, wherein the calculating unit calculates the discrimination code by applying a hash function to the third data.

4. A recording apparatus according to claim 1, wherein the third data includes at least data recorded only by the recording apparatus.

5. A recording apparatus according to claim 4, wherein the third data includes data for managing a program area of the recording medium and control data for the recording medium.

6. A recording apparatus according to claim 1, herein the second data generated by the generating unit includes data indicating that the recording was performed by an apparatus of the model of the recording apparatus and data indicating that the recording was performed by an apparatus of a model different from the recording apparatus.

7. A recording apparatus according to claim 1, wherein the calculating unit calculates the discrimination code by applying the function to the second data and the third data.

8. A recording method for a recording apparatus that records a first data in a recordable recording medium, the recording method comprising:
   recording the first data in the recording medium;
   generating a second data indicating a model of the recording apparatus; and
   applying a predetermined function to a third data, which is included in the first data recorded in the recording medium and changes every time the first data is recorded in the recording medium by the processing in the first recording step, to thereby calculate a discrimination code indicating that the recording apparatus recorded the first data in the recording medium,
   wherein recording the first data further comprises recording the discrimination code the third data, and the second data in the recording medium.

9. A non-transitory computer medium storing a program for recording first data in a recordable recording medium, the program causing a computer to execute processing comprising:
   recording the first data in the recording medium;
   generating a second data indicating a model of the recording apparatus; and
   applying a predetermined function to a third data, which is included in the first data recorded in the recording medium and changes every time the first data is recorded in the recording medium, to calculate a discrimination code indicating that the recording apparatus recorded the first data in the recording medium,
   wherein recording the first data further comprises recording the discrimination code the third data, and the second data in the recording medium.

10. A reproducing apparatus that reproduces a first data recorded in a recording medium, the reproducing apparatus comprising:
    a readout unit that reads out, from the recording medium, a second data indicating a model of a recording apparatus that performed recording of the first data in the recording medium, a third data that changes every time data is recorded in the recording medium, and a first discrimination code indicating the model of the recording apparatus that recorded the first data in the recording medium, the second data, the third data, and the first discrimination code being included in the first data;
    a calculating unit that calculates a second discrimination code indicating the model of the recording apparatus by applying a predetermined function to the third data read out by the readout unit; and
    an executing unit that executes predetermined processing using the second data when the second discrimination code calculated by the calculating unit and the first discrimination code read out by the readout unit coincide with each other.

11. A reproducing apparatus according to claim 10, wherein the calculating unit calculates the second discrimination code by applying a function for reducing an amount of data to be smaller than the third data to the third data.

12. A reproducing apparatus according to claim 11, wherein the calculating unit calculates the second discrimination code by applying a hash function to the third data.

13. A reproducing apparatus according to claim 10, wherein the third data includes at least data recorded only by the recording apparatus.

14. A reproducing apparatus according to claim 13, wherein the third data includes data for managing a program area of the recording medium and control data for the recording medium.

15. A reproducing apparatus according to claim 13, wherein the calculating unit calculates the second discrimination code by applying the function to the second data and the third data.

16. A reproducing method for a reproducing apparatus that reproduces a first data recorded in a recording medium, the reproducing method comprising:
    reading out, from the recording medium, a second data indicating a model of a recording apparatus that performed recording of the first data in the recording medium, a third data that changes every time data is recorded in the recording medium, and a first discrimination code indicating the model of the recording apparatus that recorded the first data in the recording medium, the second data, the third data, and the first discrimination code being included in the first data;
    calculating a second discrimination code indicating the model of the recording apparatus, by applying a predetermined function to the third data; and using the second data when the second discrimination code and the first discrimination code coincide with each other.

17. A non-transitory computer-readable medium storing a program for reproducing a first data recorded in a recording medium, the program causing a computer to execute processing comprising:

reading out, from the recording medium, a second data indicating a model of a recording apparatus that performed recording of the first data in the recording medium, a third data that changes every time data is recorded in the recording medium, and a first discrimination code indicating the model of the recording apparatus that recorded the first data in the recording medium, the second data, the third data, and the first discrimination code being included in the first data;

calculating a second discrimination code indicating the model of the recording apparatus by applying a predetermined function to the third data; and using the second data when the second discrimination code and the first discrimination code coincide with each other.

* * * * *